(12) United States Patent
Griffin et al.

(10) Patent No.: US 10,912,632 B2
(45) Date of Patent: Feb. 9, 2021

(54) MOTOR-DRIVEN DISPENSING GUN FOR AND METHOD OF DISPENSING FLUID OR SEMI-FLUID MATERIAL

(71) Applicant: Practicon, Inc., Greenville, NC (US)

(72) Inventors: Bradley P. Griffin, Greenville, NC (US); George E. Riehm, New Fairfield, CT (US); Gregor G. Weaver, Waterbury, CT (US); John R. Laverack, Southbury, CT (US); Gregory A. Thomas, Stratford, CT (US)

(73) Assignee: PRACTICON, INC., Greenville, NC (US)

( * ) Notice: Subject to any disclaimer, the term of this patent is extended or adjusted under 35 U.S.C. 154(b) by 192 days.

(21) Appl. No.: 15/927,705

(22) Filed: Mar. 21, 2018

(65) Prior Publication Data
US 2019/0290406 A1 Sep. 26, 2019

(51) Int. Cl.
*A61C 9/00* (2006.01)
*A61C 1/00* (2006.01)
*B05C 17/01* (2006.01)

(52) U.S. Cl.
CPC .......... *A61C 9/0026* (2013.01); *A61C 1/0015* (2013.01); *B05C 17/0103* (2013.01); *A61C 2204/002* (2013.01)

(58) Field of Classification Search
CPC ....... A61C 9/0026; A61C 1/0015; A61C 5/62; A61C 5/64; B05C 17/0103; B05C 17/012; B05C 17/0116
See application file for complete search history.

(56) References Cited

U.S. PATENT DOCUMENTS

| | | | |
|---|---|---|---|
| 4,249,677 A * | 2/1981 | Davis, Jr. | B05C 17/012 222/326 |
| 4,615,469 A * | 10/1986 | Kishi | B05C 17/0103 222/327 |
| 4,653,675 A | 3/1987 | Ratzky | |

(Continued)

FOREIGN PATENT DOCUMENTS

WO  1995016134 A1  6/1995

OTHER PUBLICATIONS

Fishman, Dental Fluid Dispensing Applications with the SmartDispenser, Jul. 18, 2017.

(Continued)

*Primary Examiner* — Ralph A Lewis
(74) *Attorney, Agent, or Firm* — Ward and Smith, P.A.; Ryan K. Simmons

(57) ABSTRACT

A motor-driven fluid, semi-fluid, or semi-sold material dispensing apparatus including a housing; a plunger/drive rack; an electric motor mounted transverse to the plunger/drive rack; a gear system mechanically coupled to the electric motor and configured to drive the plunger/drive rack, wherein the gear system includes a rack drive gear operatively engaged with the electric motor, the rack drive gear includes a plurality of saw tooth type gear teeth, the rack drive gear teeth being configured to engage with corresponding teeth disposed on the plunger/drive rack; and wherein, the electric motor and gear system are housed in a main body portion of the housing.

22 Claims, 36 Drawing Sheets

(56) References Cited

U.S. PATENT DOCUMENTS

| | | | |
|---|---|---|---|
| 5,341,958 A * | 8/1994 | Bayat | B05C 17/0103 |
| | | | 222/333 |
| 5,672,155 A * | 9/1997 | Riley | A61M 5/20 |
| | | | 604/131 |
| 6,089,407 A | 7/2000 | Gardos | |
| 6,540,113 B2 | 4/2003 | Gardos | |
| 6,582,405 B2 * | 6/2003 | Kawagishi | A61M 5/20 |
| | | | 433/114 |
| 6,616,448 B2 | 9/2003 | Friedman | |
| 6,790,037 B1 | 9/2004 | Orecchia | |
| 6,889,872 B2 | 5/2005 | Herman et al. | |
| 7,116,071 B2 * | 10/2006 | Glasgow | B05C 17/00503 |
| | | | 318/280 |
| 7,913,881 B2 | 3/2011 | Herman | |
| 7,950,549 B1 | 5/2011 | Harris | |
| 7,972,057 B2 * | 7/2011 | Meyer | A61C 5/64 |
| | | | 366/172.1 |
| 8,544,689 B2 | 10/2013 | Bertram et al. | |
| 8,568,141 B2 * | 10/2013 | Tanaka | A61M 5/20 |
| | | | 433/90 |
| 8,944,814 B2 | 2/2015 | Mossle | |
| 9,089,645 B2 * | 7/2015 | Leak | A61M 5/31545 |
| 9,408,969 B2 * | 8/2016 | Tanaka | A61M 5/20 |
| 9,452,443 B2 * | 9/2016 | Grontved | B05B 12/002 |
| 9,668,826 B2 | 6/2017 | Claypool et al. | |
| 2008/0264971 A1 | 10/2008 | Harre et al. | |
| 2015/0017602 A1 | 1/2015 | Arocha | |

OTHER PUBLICATIONS

Composite World, Portable, cordless adhesive dispensing gun, Jul. 18, 2017.

* cited by examiner

MOTOR-DRIVEN DISPENSING GUN FOR AND METHOD OF DISPENSING FLUID OR SEMI-FLUID MATERIAL

TECHNICAL FIELD

The presently disclosed subject matter relates generally to hand-held fluid dispensers and more particularly to a hand-held motor-driven dispensing gun for and method of dispensing fluid or semi-fluid (or semi-solid) material.

BACKGROUND

One example of a dispensing gun for dispensing fluid or semi-fluid (or semi-solid) material is a dental impression gun. A dental impression gun or applicator is a type of instrument for dispensing a fluid or semi-fluid (or semi-solid) impression material, such as, but not limited to, polyvinyl siloxane (PVS) impression material, also called vinyl polysiloxane (VPS) impression material. The dental impression gun is a handheld instrument typically including a manual ratchet-type of plunger mechanism for pushing the impression material out of a cartridge. Namely, during the dispensing process, a user must manually squeeze and then release a trigger in repeated fashion in order to push the impression material out of the cartridge. A drawback of these manual dental impression guns is that the dispensing process can be slow and messy. Further, the dispense rate and volume can be inconsistent from one trigger pull to another. Additionally, the dispense rate and volume can be different from one user to another.

Dispensing guns exist that have motorized drive mechanisms. However, a drawback to current motorized dispensing guns is that they can be complex and costly. Further, current manual and electric dispensing guns are prone to dripping upon releasing the trigger.

SUMMARY

In one embodiment, a motor-driven material dispensing apparatus is disclosed. The apparatus may include a housing, the housing may include a main body portion and a handle portion. The apparatus may further include a plunger/drive rack; an electric motor mounted transverse to the plunger/drive rack; a gear system mechanically coupled to the electric motor and configured to drive the plunger/drive rack, wherein the gear system may include a rack drive gear operatively engaged with the electric motor, the rack drive gear may include a plurality of saw tooth type gear teeth, the rack drive gear teeth being configured to engage with corresponding gear teeth disposed on the plunger/drive rack; and wherein, the electric motor and gear system may be housed in the upper body portion. The gear system may further include a pinion gear and a spur gear, wherein the rack drive gear is mechanically coupled to the spur gear, the spur gear is mechanically coupled to the pinion gear, and the pinion gear is mechanically coupled to the electric motor. A trigger switch may be provided to operate the electric motor to drive the gear system and effect dispensing of the material in response to the longitudinal movement of the plunger/drive rack into engagement with one or more material cartridges comprising fluid or semi-fluid material therein. The electric motor may include an adjustable variable speed motor. Upon release of the trigger switch, the electric motor may automatically reverses its direction for a defined period of time reversing the direction of the rack drive gear thereby reversing the movement of plunger/drive rack. Upon release of the trigger switch, the electric motor may automatically reverse its direction at full speed, regardless of its speed setting. The defined period of time may be about 1.5 seconds, or other time period sufficient minimalize or eliminate further dispensing of the material upon release of the trigger switch. The apparatus may further include a cartridge opening formed in the upper housing portion, wherein the cartridge opening may be configured to receive one or more material cartridges in a position forward of the plunger/drive rack. The one or more material cartridges may include an amount of fluid, semi-fluid, or semi-solid material. The apparatus may further include a cartridge clamp hingeably coupled to the upper housing portion, wherein the cartridge clamp may be positioned and configured to provide access for loading and unloading the one or more material cartridges when in an open positon and to secure the one or more material cartridges into the cartridge opening when in a closed positon. The apparatus may further include a rechargeable battery housed in the handle portion. The apparatus may further include a charging and/or power port disposed in the handle portion. The apparatus may further include a base configured to receive the handle portion. The apparatus may further include a release lever configured for manual removal of the plunger/drive rack from the main body portion. The apparatus may further include a speed controller configured to allow a user to adjust a speed of the adjustable variable speed motor. The plunger/drive rack may include a plunger end at its distal end configured to engage with the one or more material cartridges, the plunger end may include one or more push pads, e.g., two push pads. The plunger/drive rack may include a slot along its length extending from about a midway portion of the plunger/drive rack and opening to the plunger end between the push pads, e.g., between the two push pads. The plunger/drive rack gear teeth may be provided on both sides of the slot. The apparatus may further include control electronics, including one or more of a controller, memory device, communications interface; flow control module, motion control module, overload protection module, overcharge protection module, and one or more indicators, wherein the one or more control electronics are in communication with one another and/or a computing device. The material may include one or more of fluid, semi-fluid, or semi-solid material.

In another embodiment, a method of using a motor-driven material dispensing apparatus is disclosed. The method may include providing the motor-driven material dispensing apparatus, wherein the dispensing apparatus may include a housing comprising an upper body portion and a handle portion; a plunger/drive rack; an electric motor mounted transverse to the plunger/drive rack; a gear system mechanically coupled to the electric motor and configured to drive the plunger/drive rack, wherein the gear system may include a rack drive gear operatively engaged with the electric motor, the rack drive gear may include a plurality of saw tooth type gear teeth, the gear teeth being configured to engage with corresponding gear teeth disposed on the plunger/drive rack; and wherein, the electric motor and gear system may be housed in the upper body portion. The method may further include loading material to be dispensed; setting dispensing speed; activating dispensing apparatus; and deactivating dispensing apparatus. The method may further include upon deactivating the dispensing apparatus automatically activating the electric motor to reverse its direction at full speed for a defined period of time. The material may include one or more of fluid, semi-fluid, or semi-solid material.

BRIEF DESCRIPTION OF THE DRAWINGS

Figure 1:
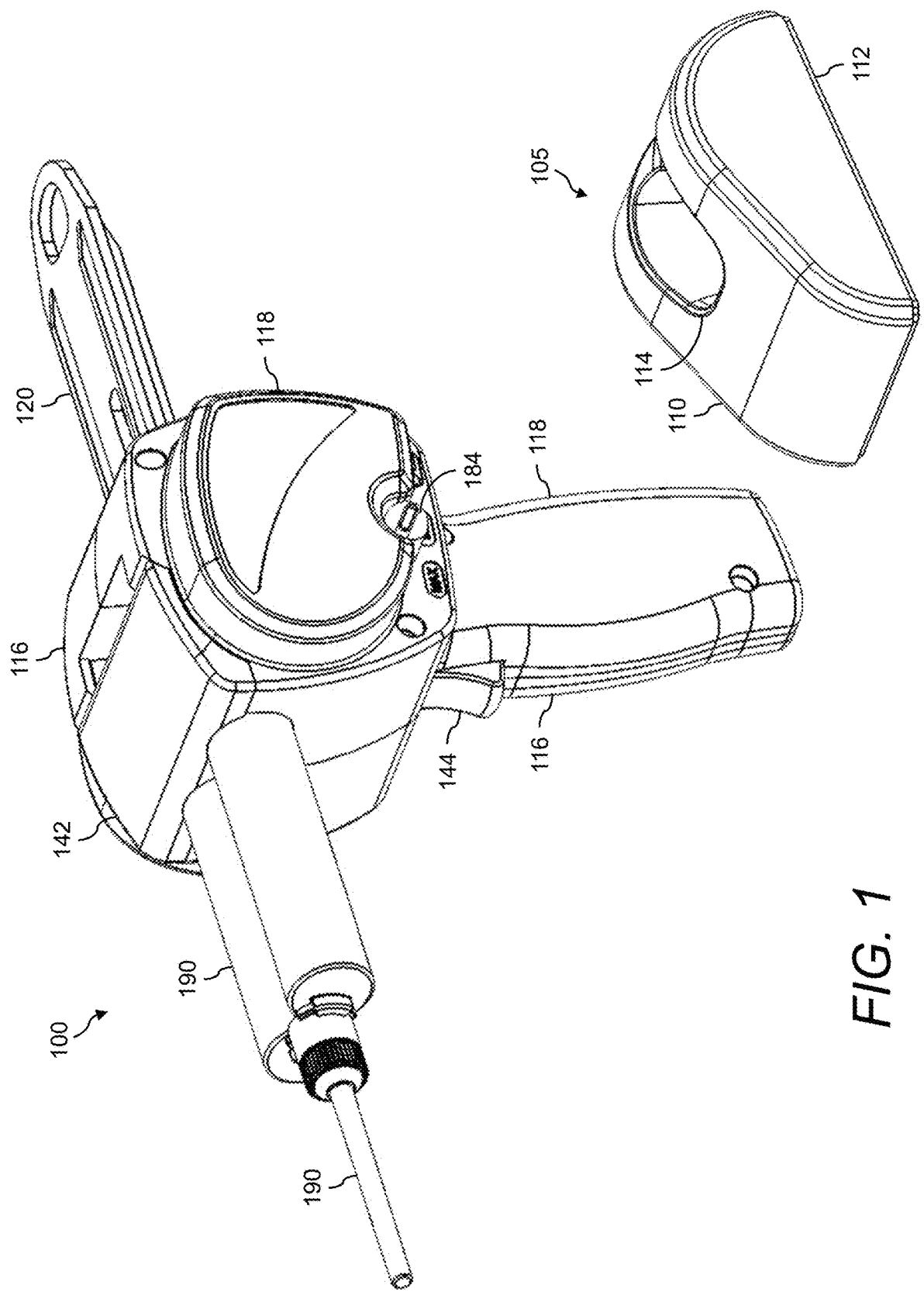
Figure 2:
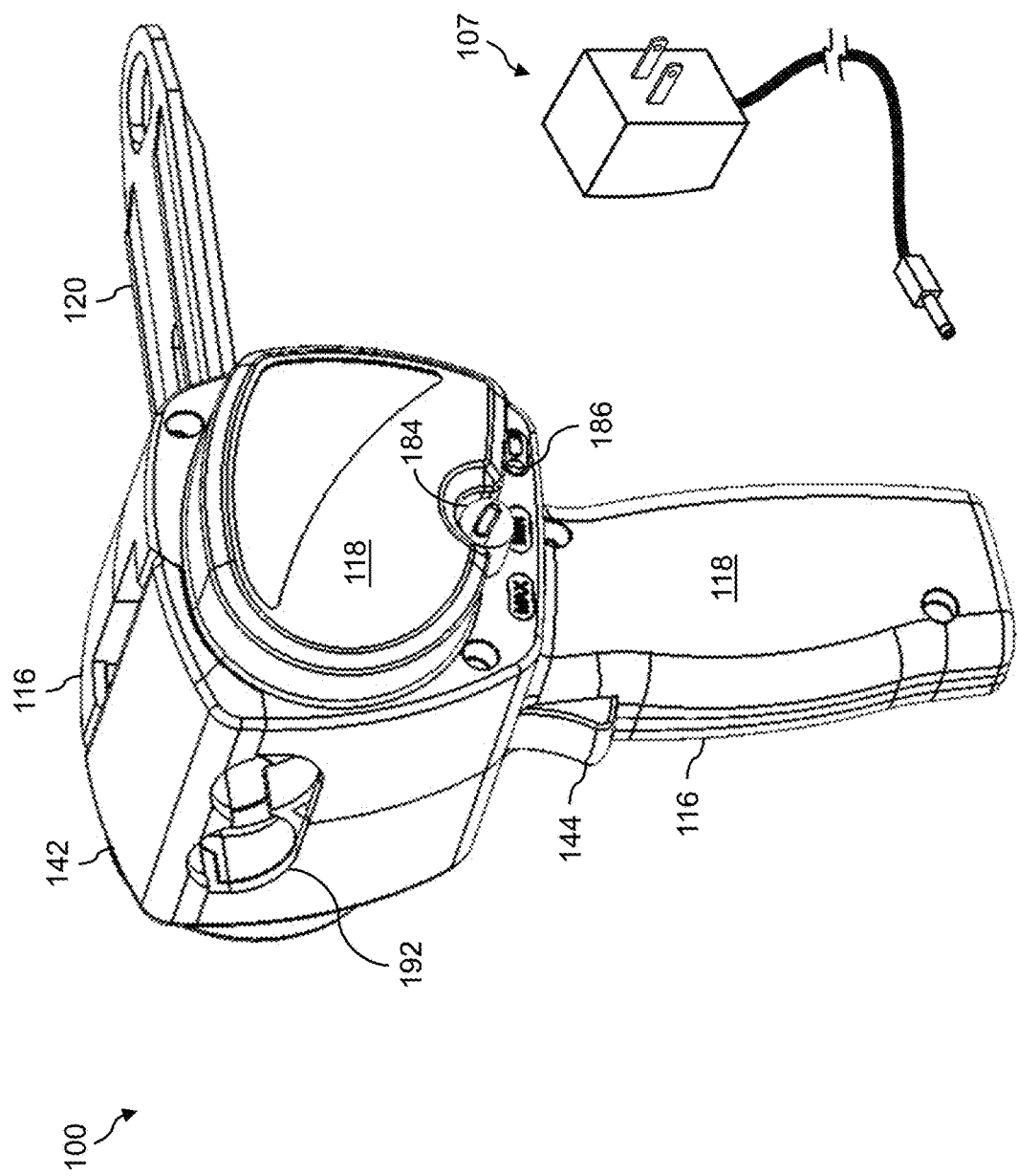
Figure 3:
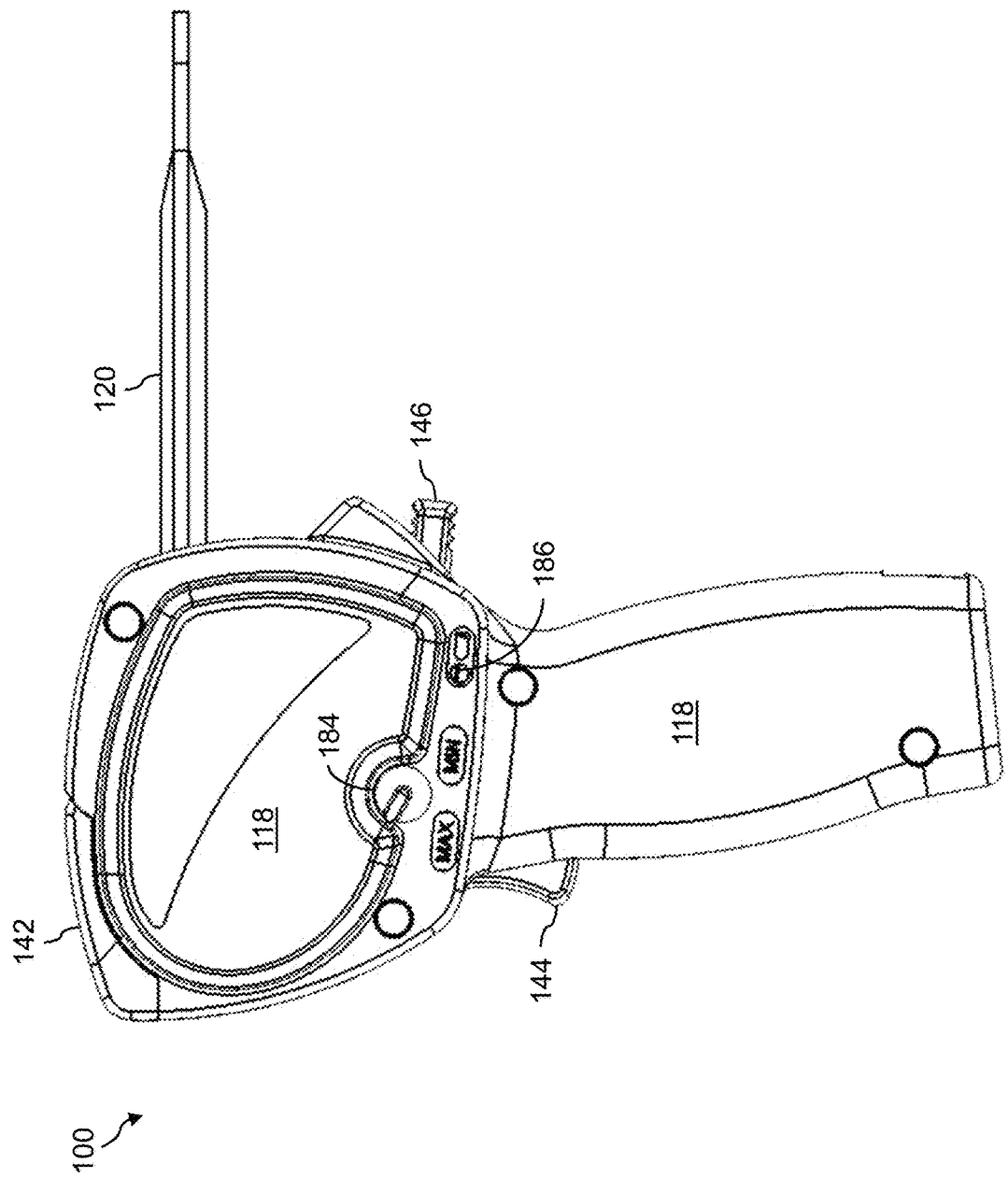
Figure 4:
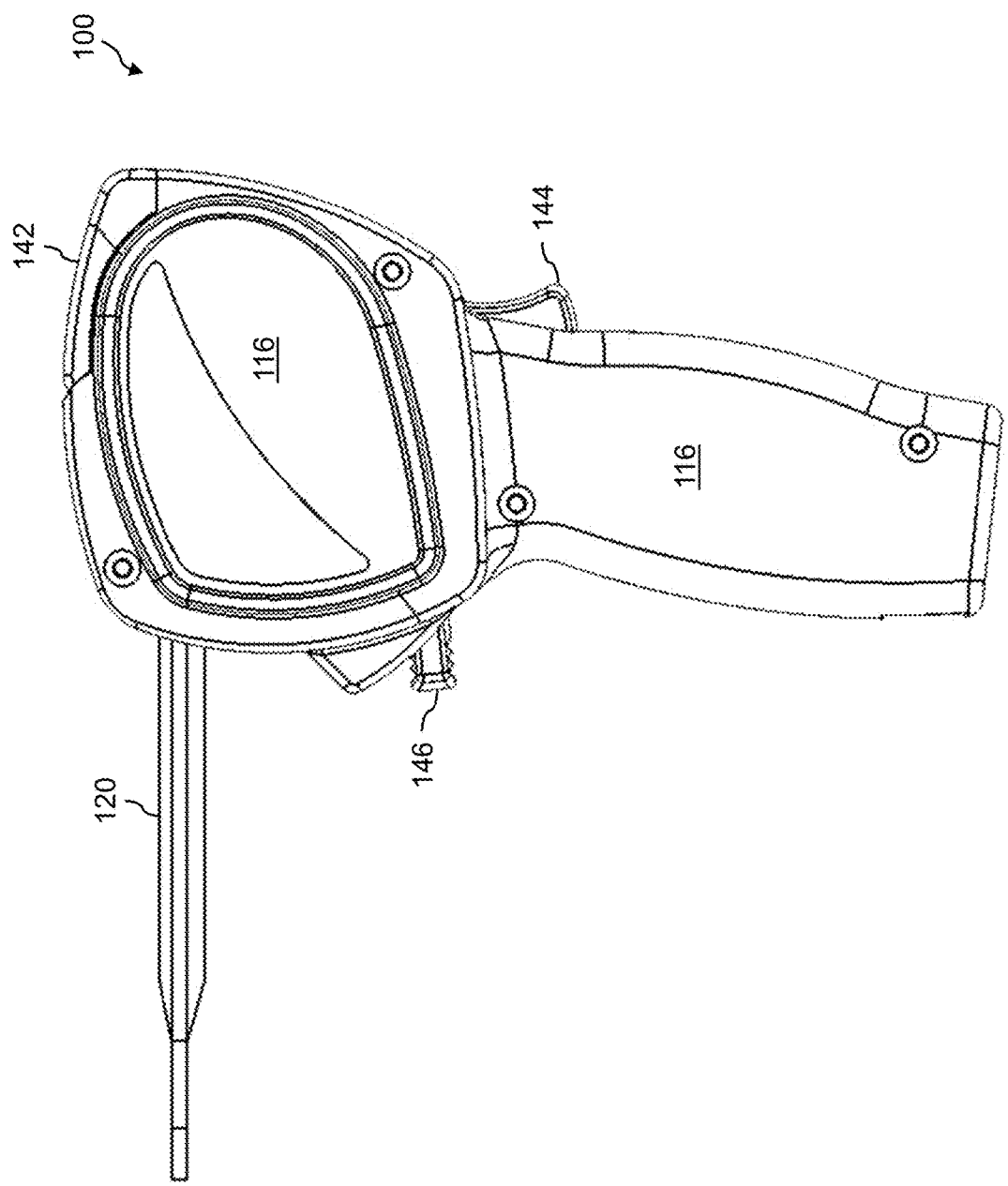
Figure 6:
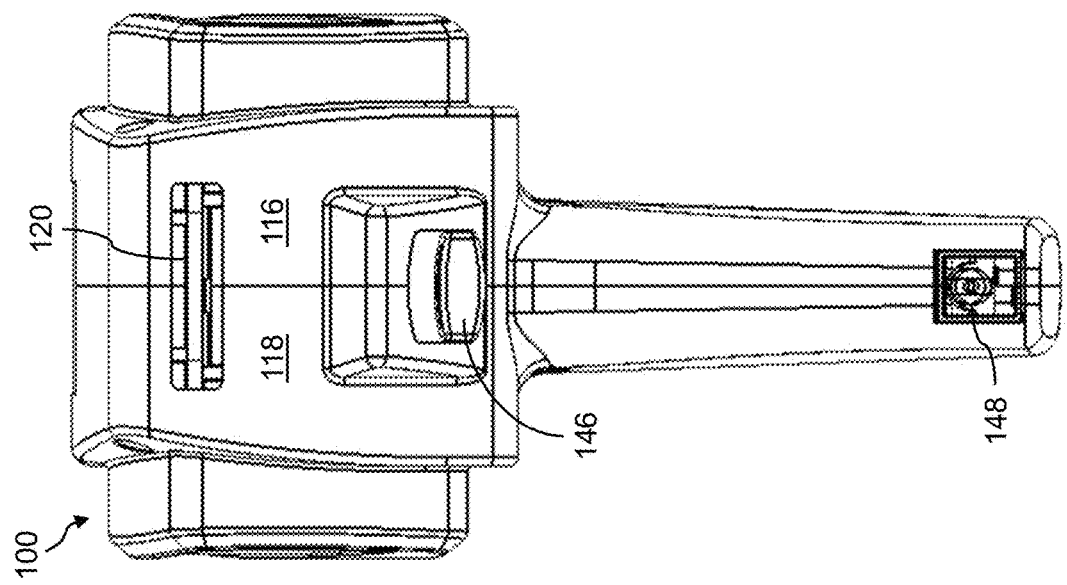
Figure 5:
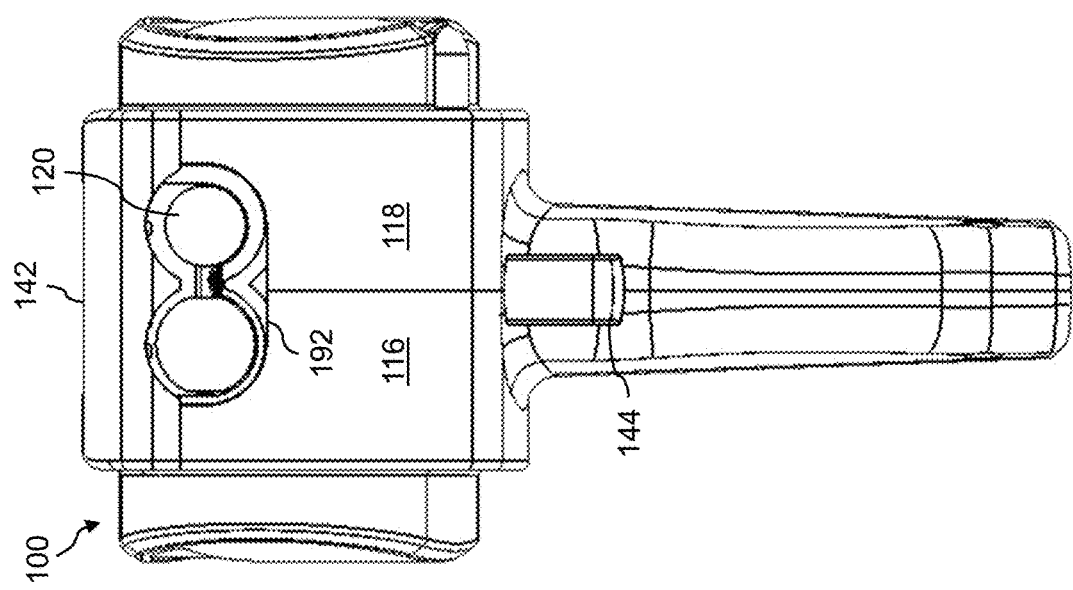
Figure 7:
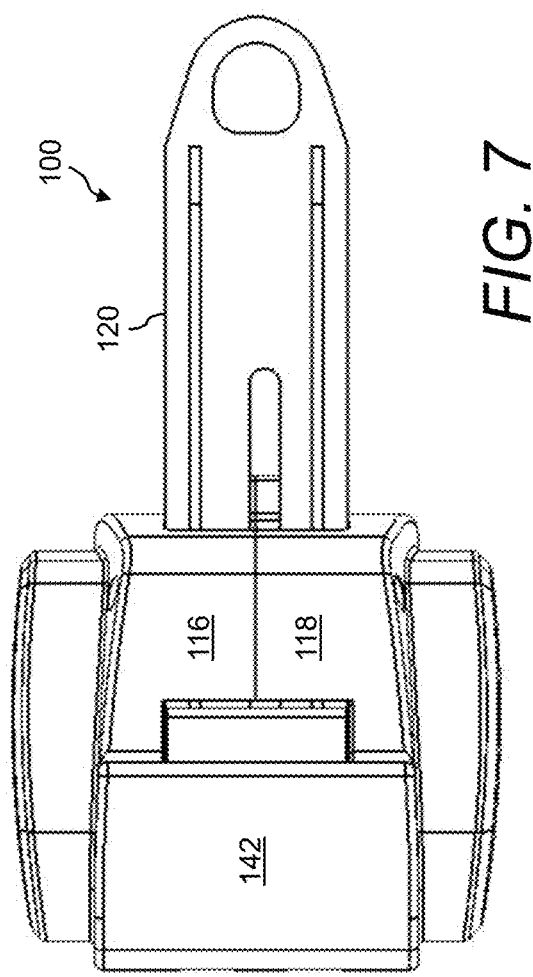
Figure 8:
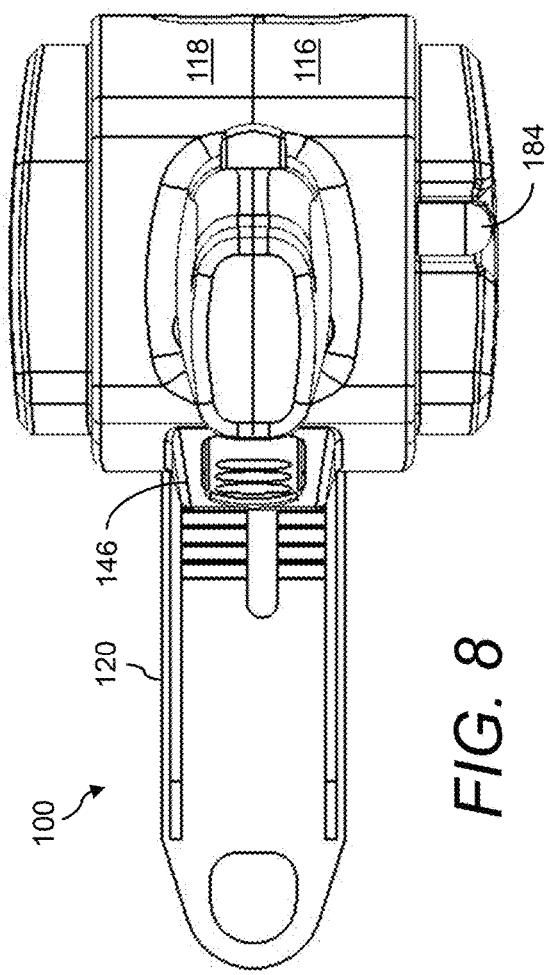
Figure 9:
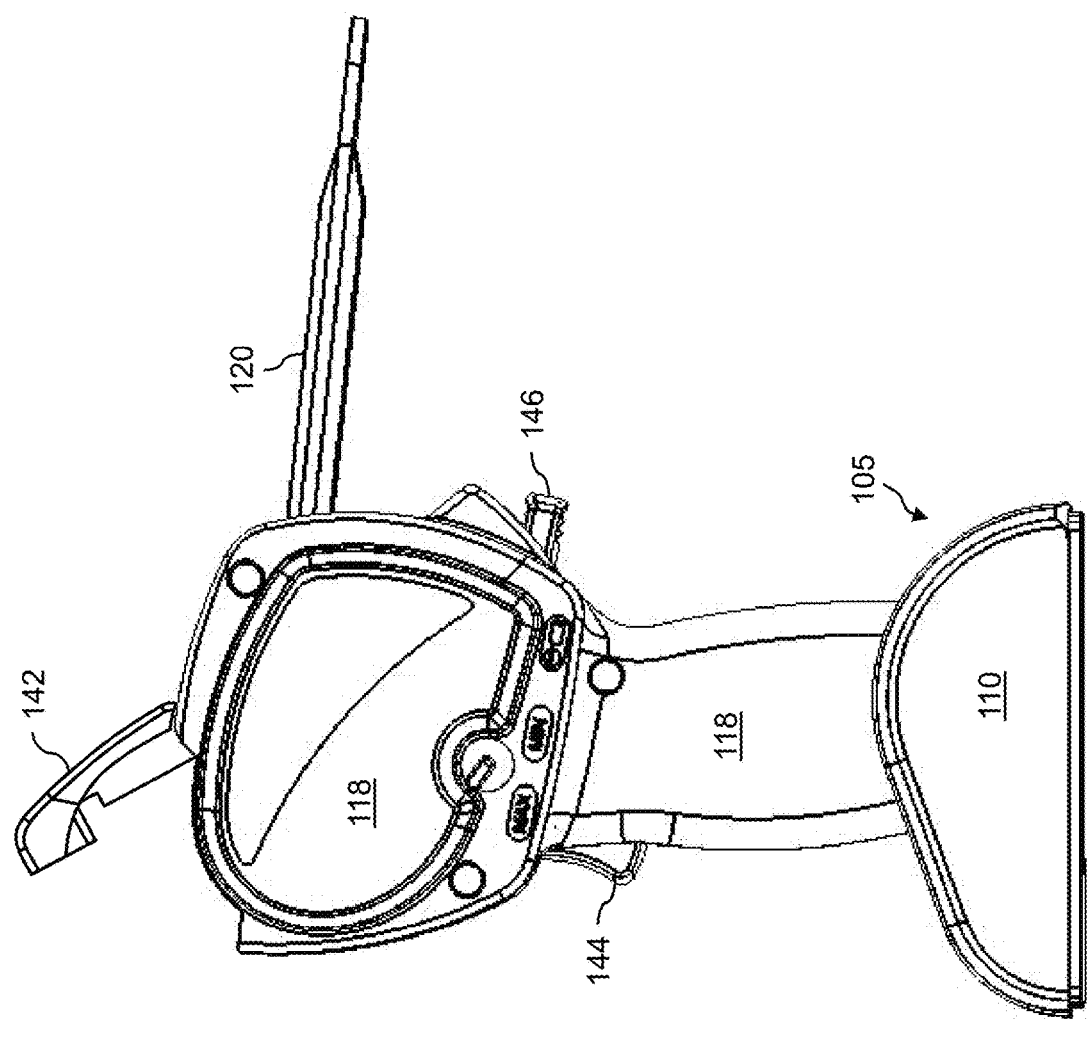
Figure 10:
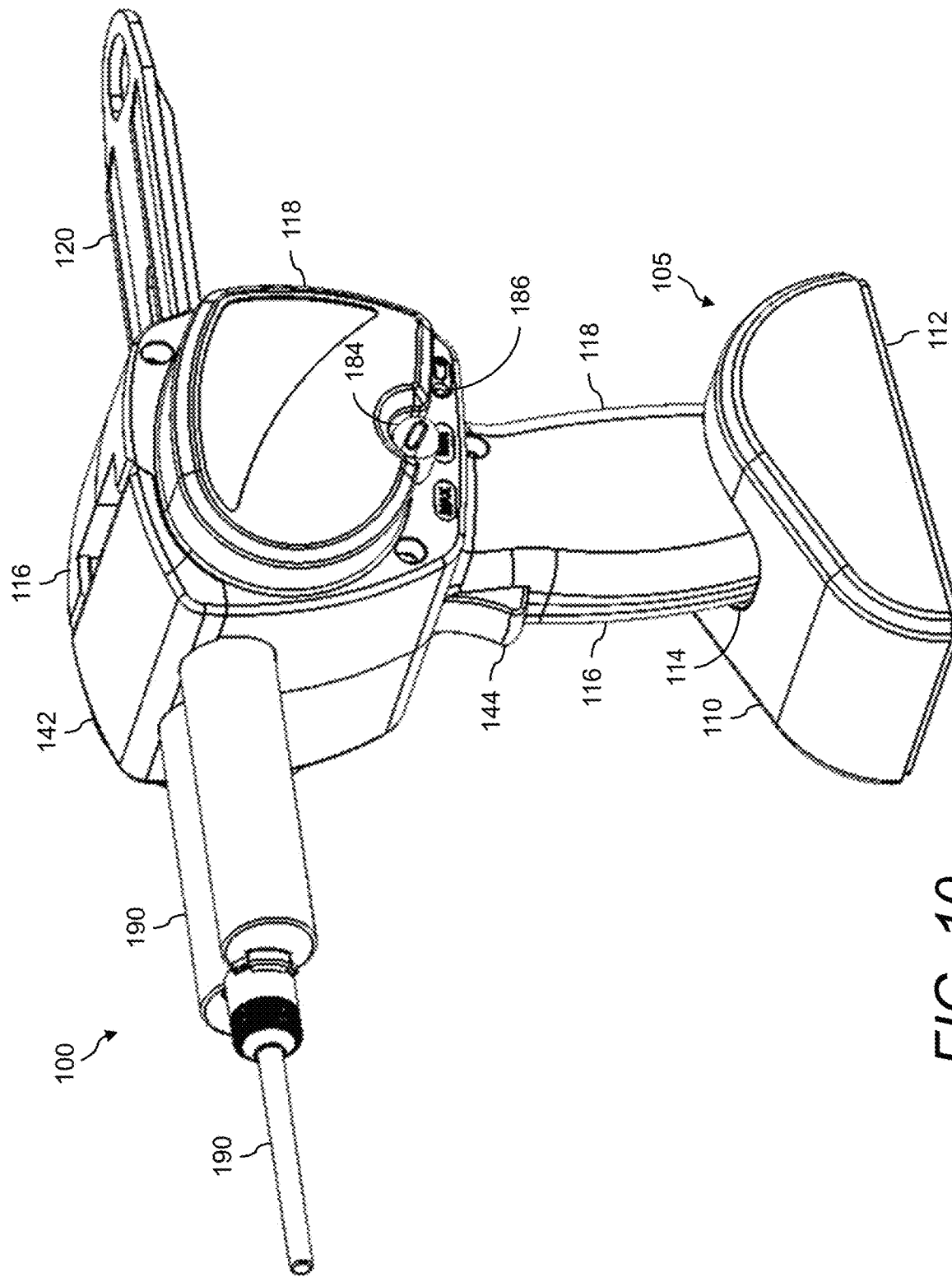
Figure 11:
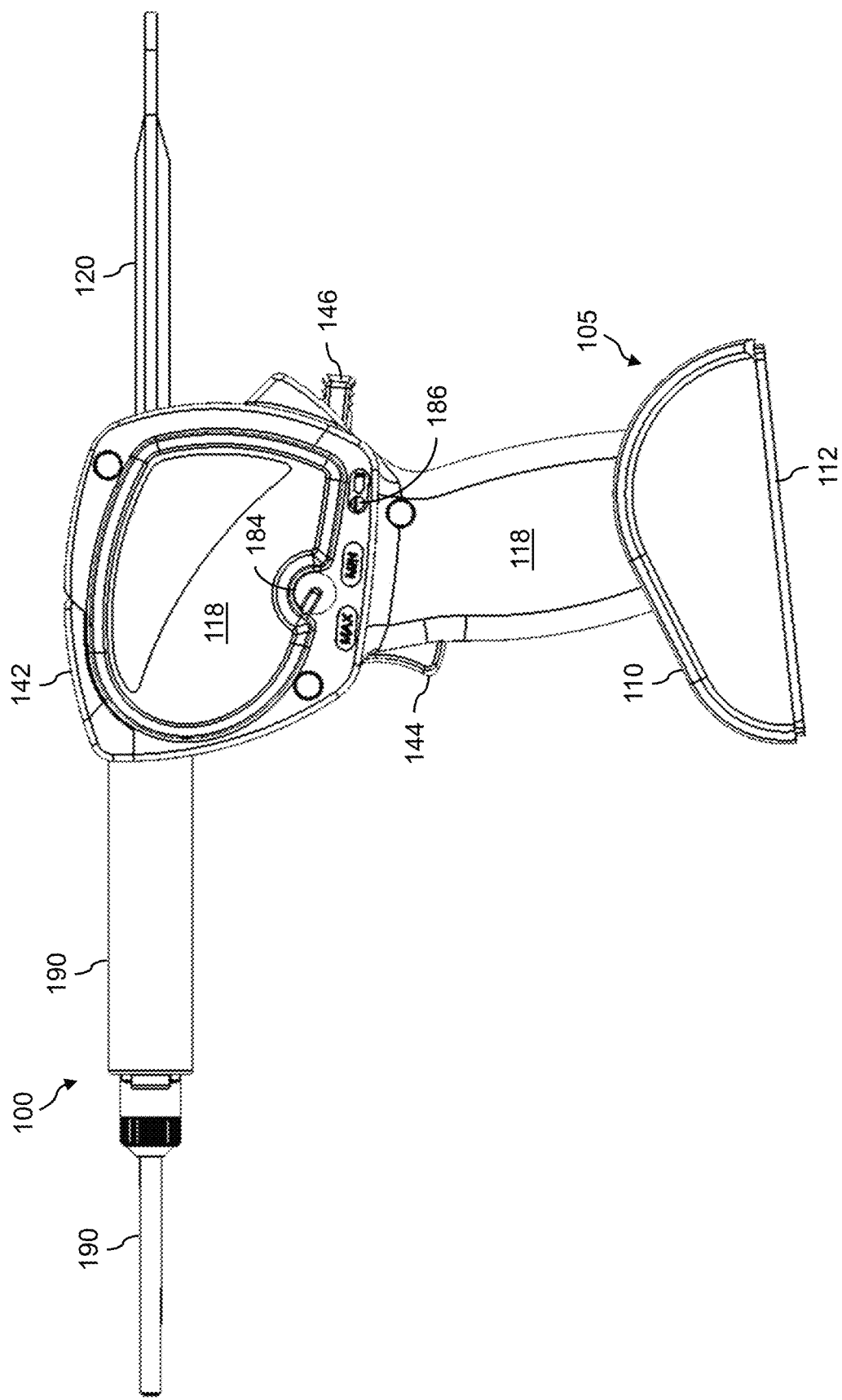
Figure 15:
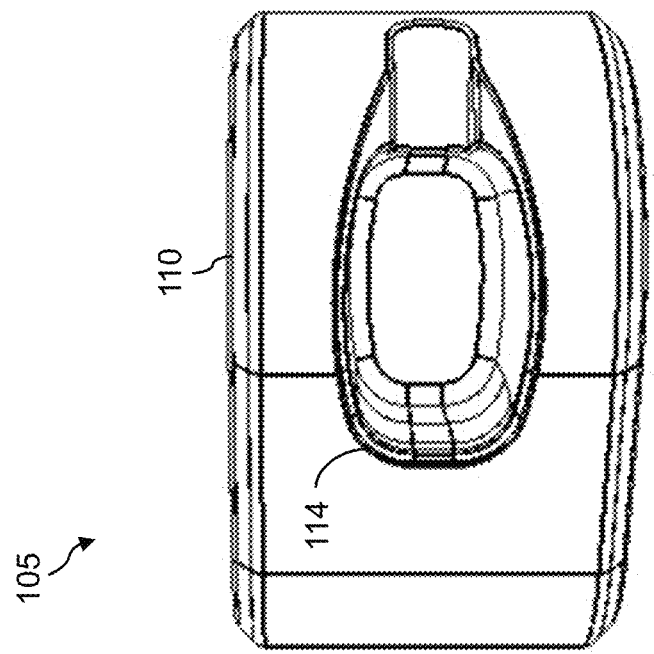
Figure 14:
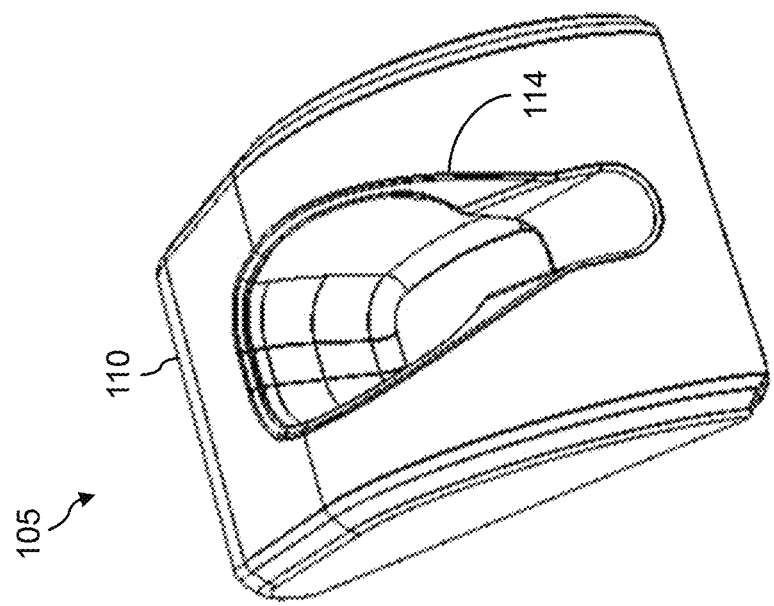
Figure 16:
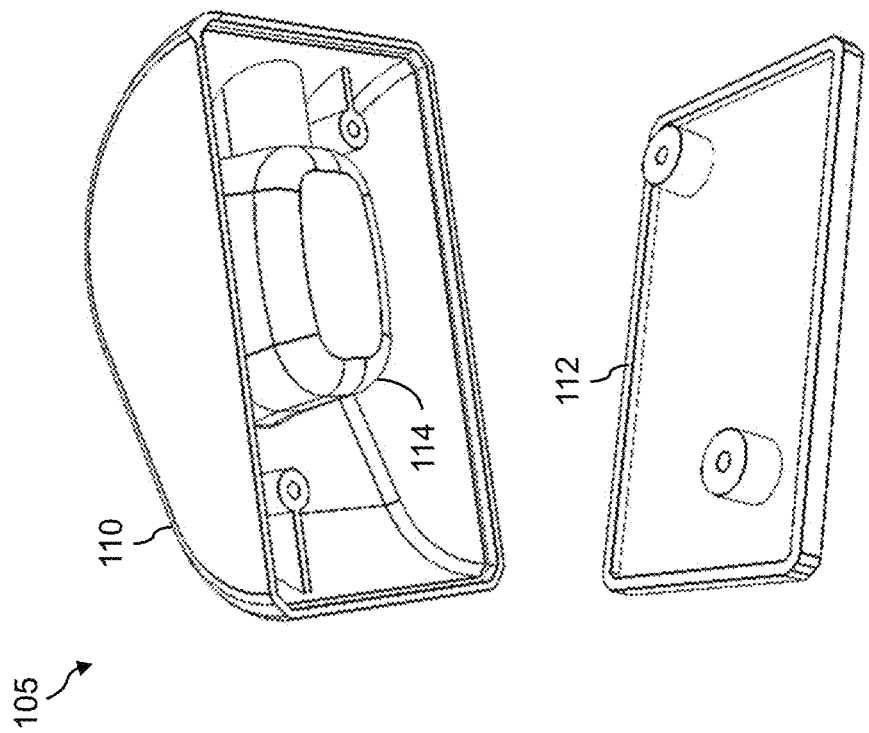
Figure 17:
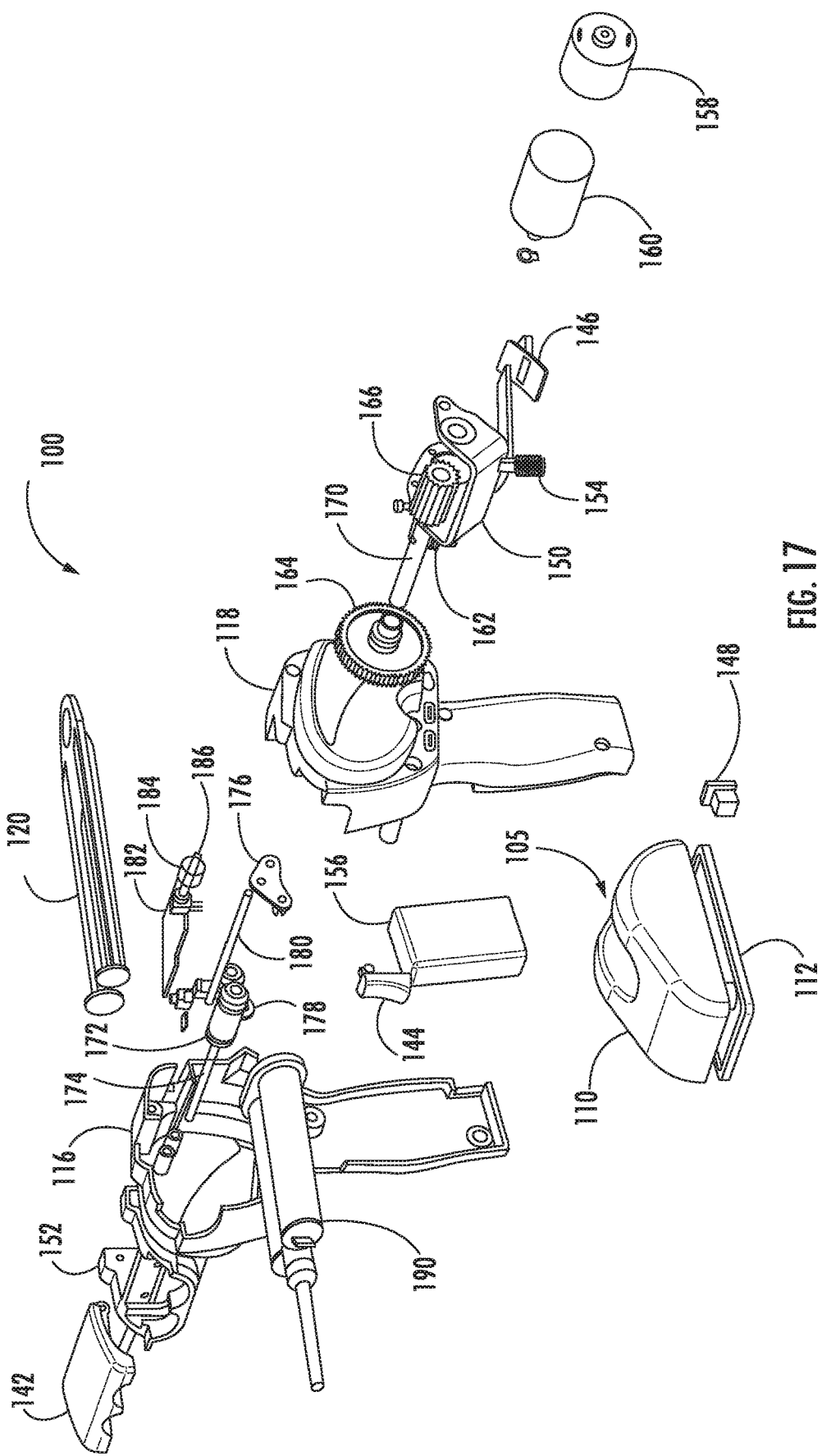
Figure 18:
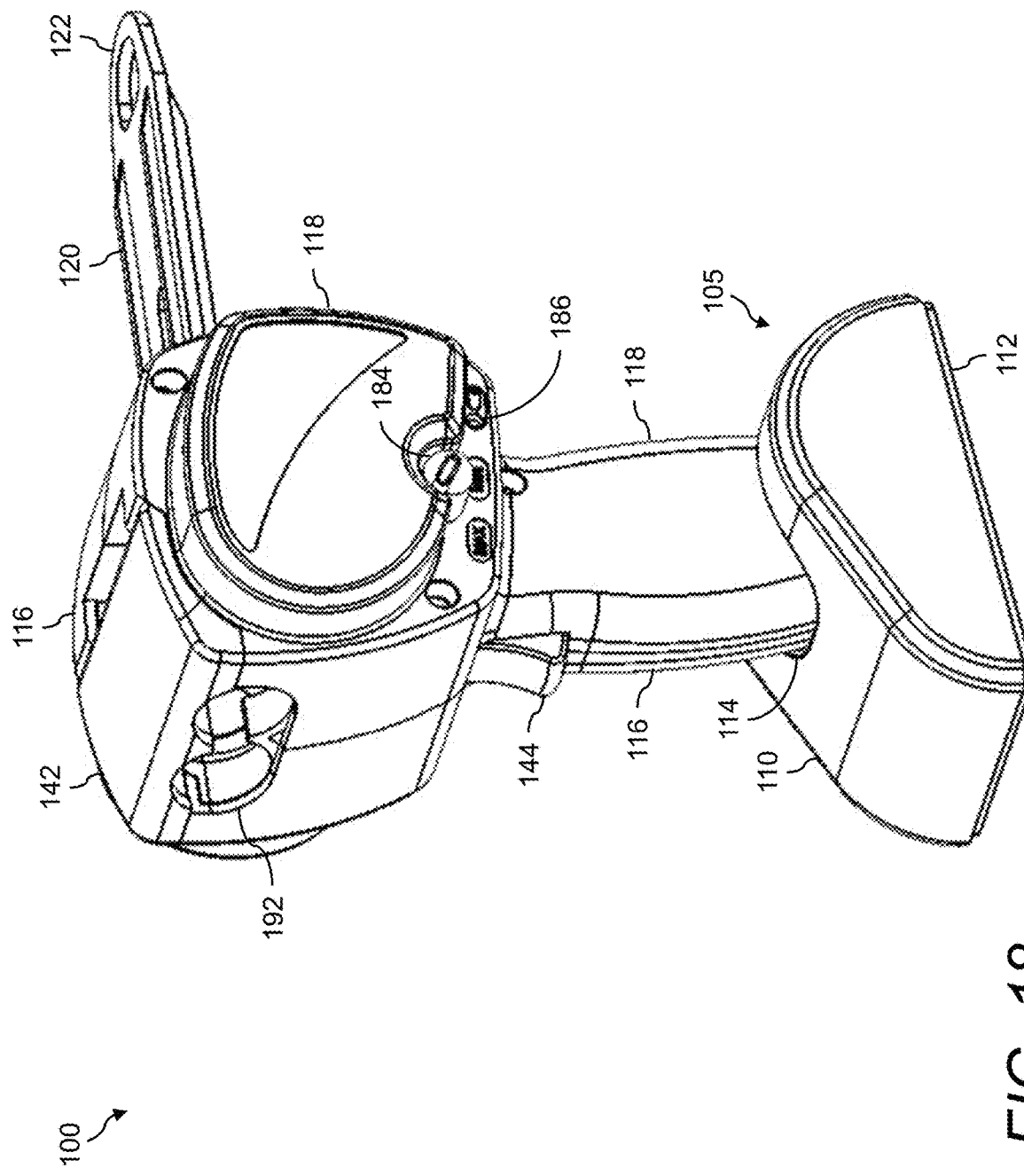
Figure 19:
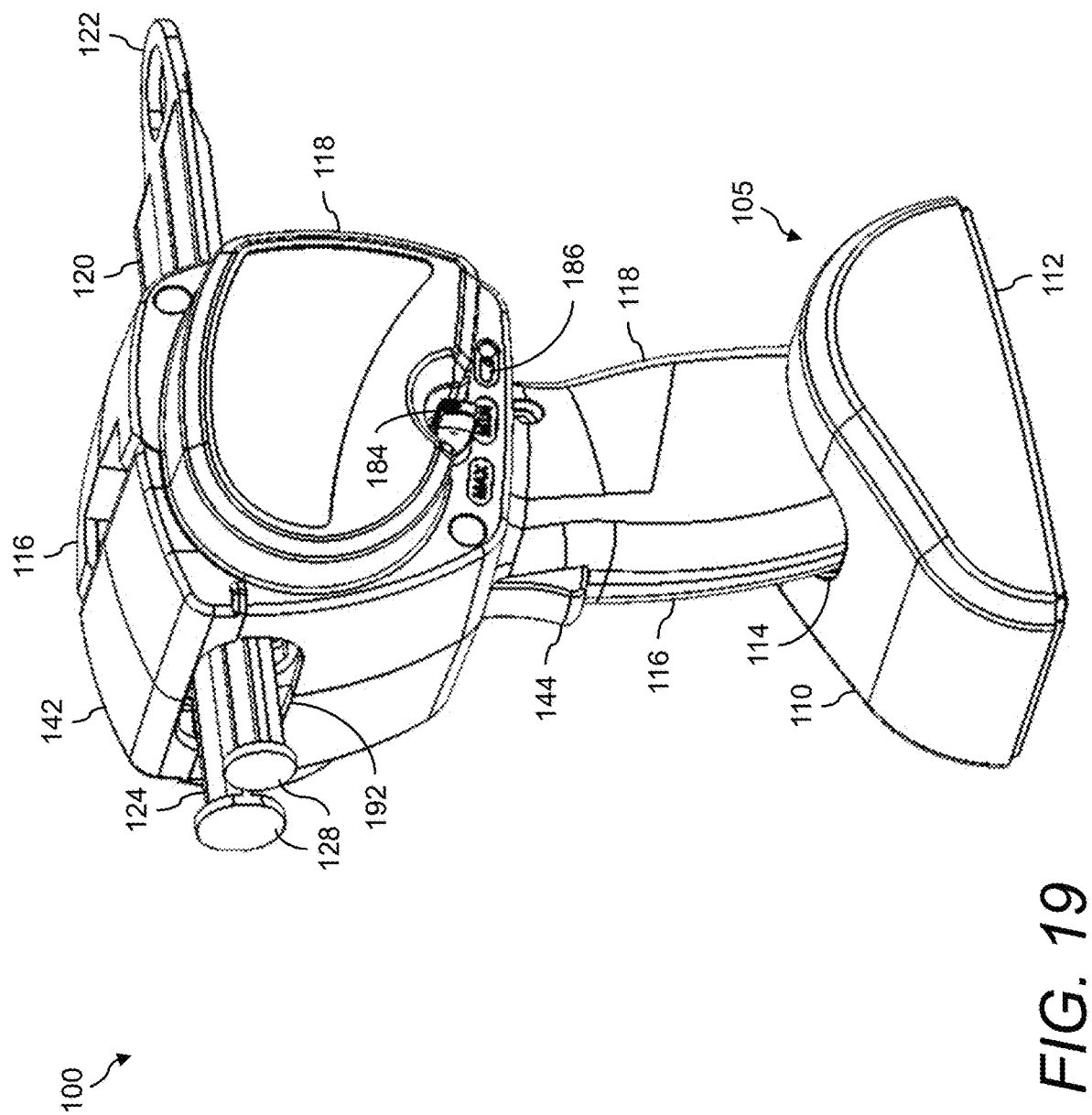
Figure 20:
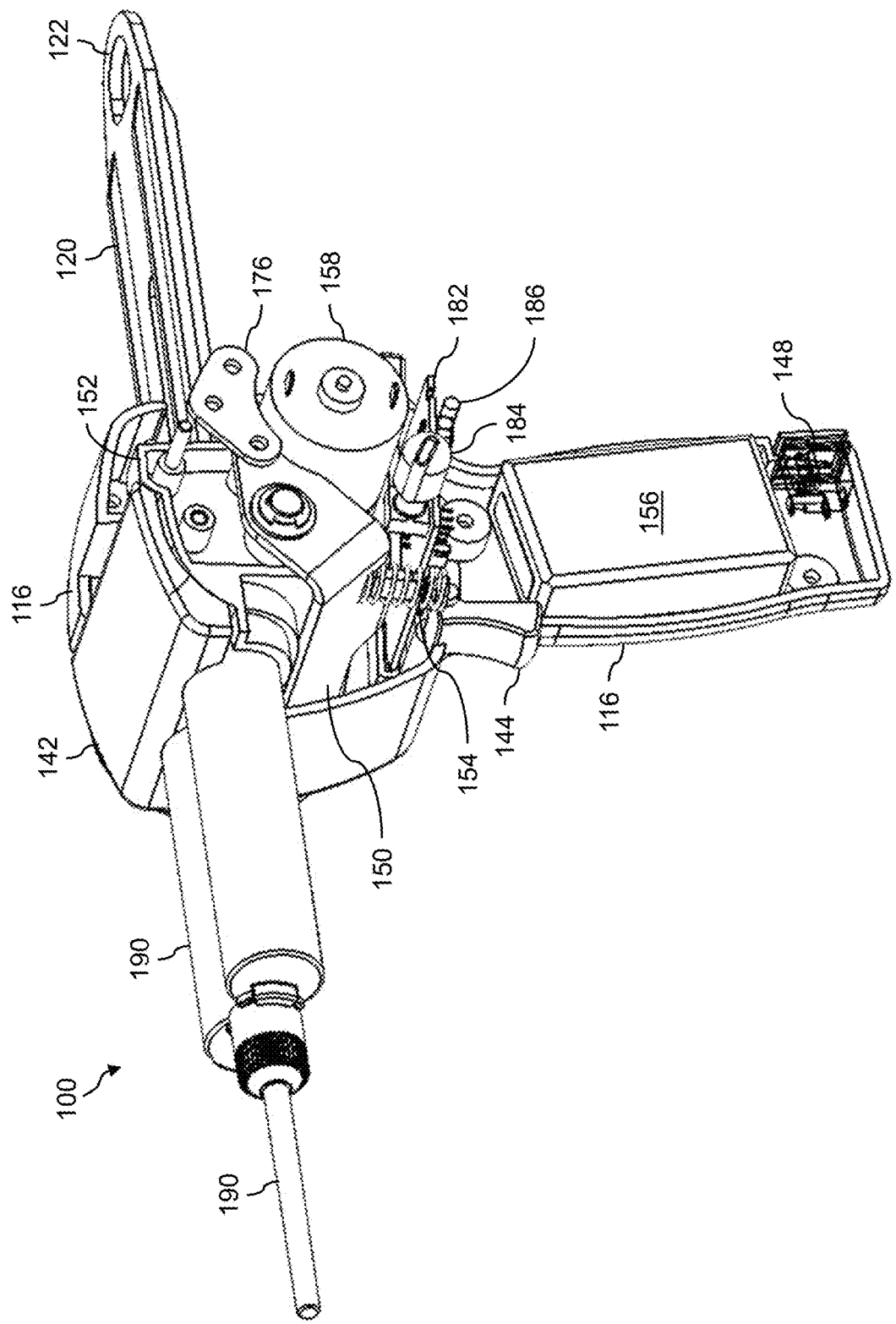
Figure 21:
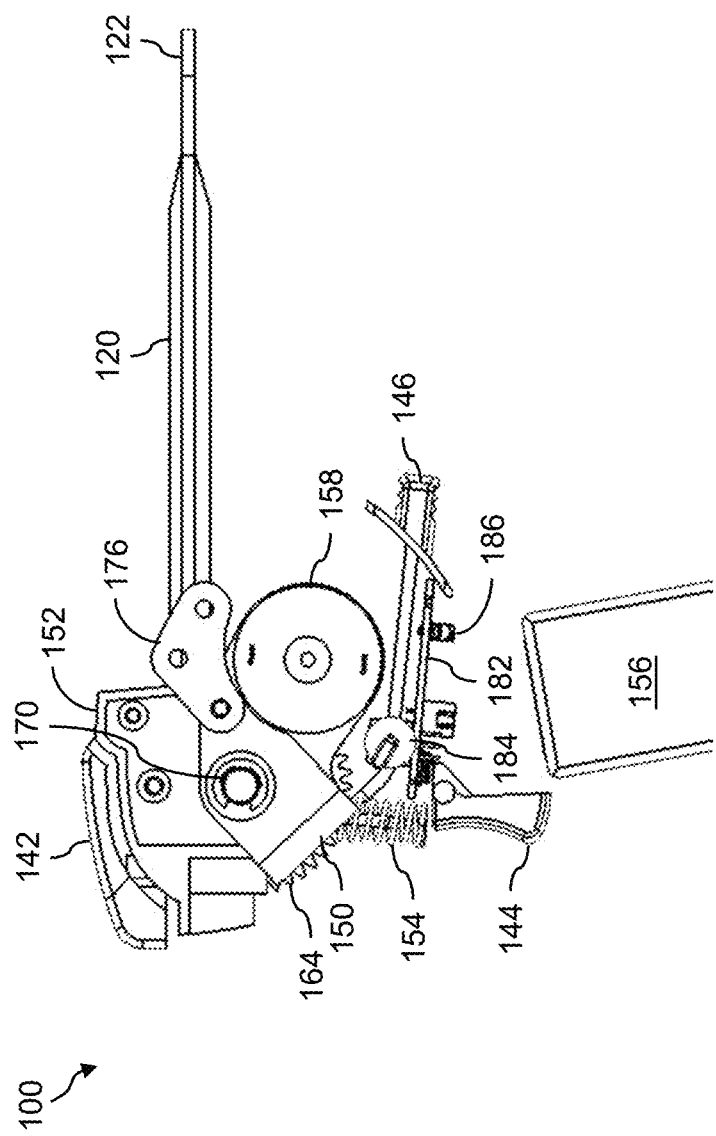
Figure 22:
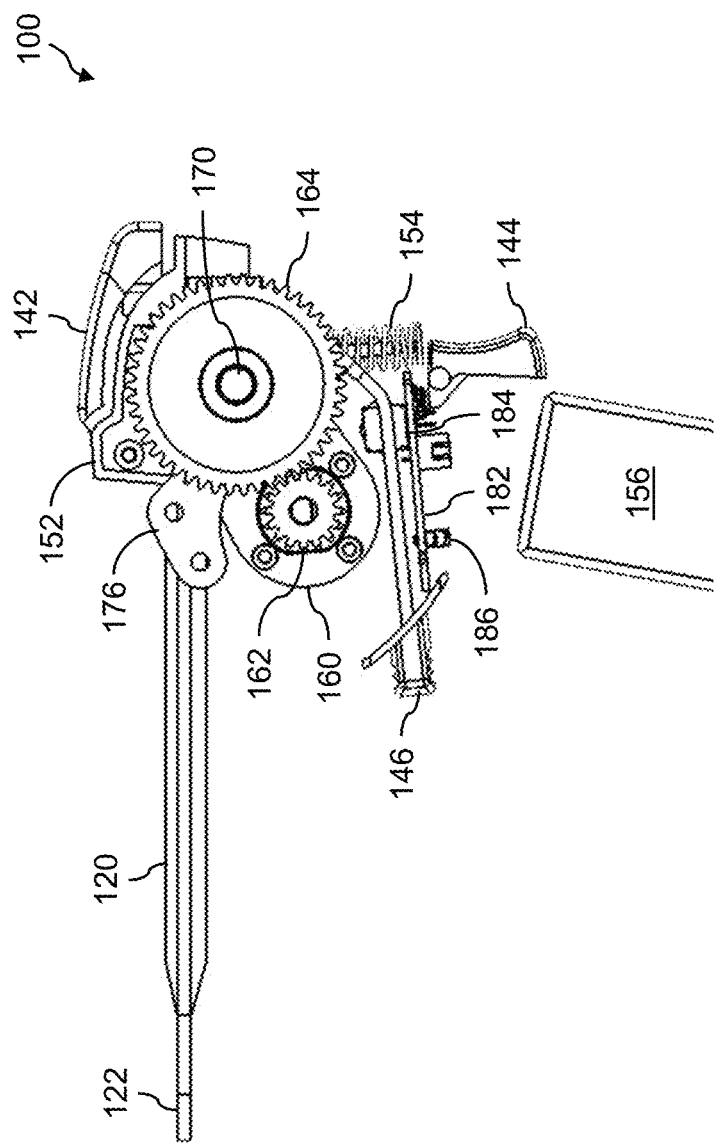
Figures 23, 24:
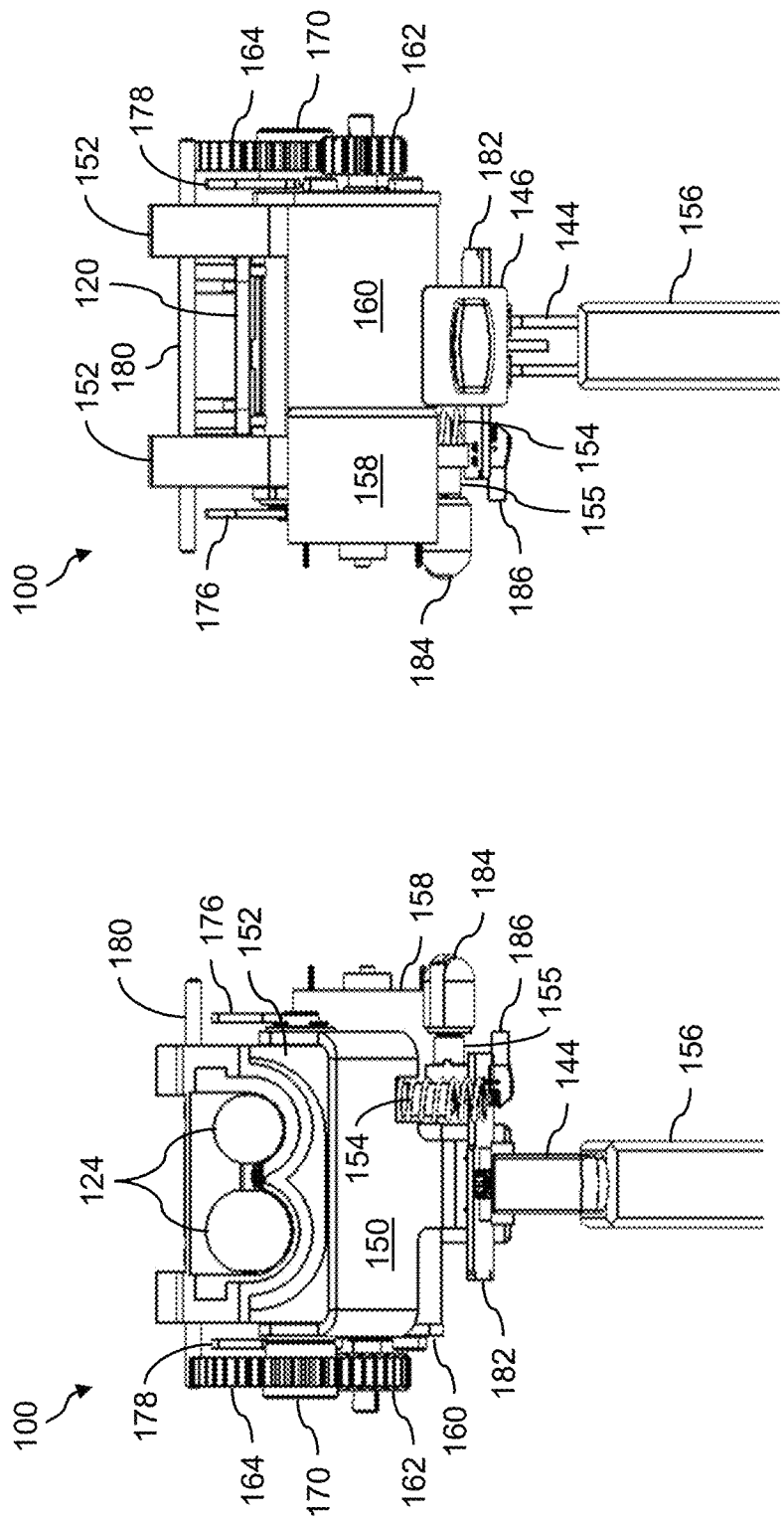
Figure 25:
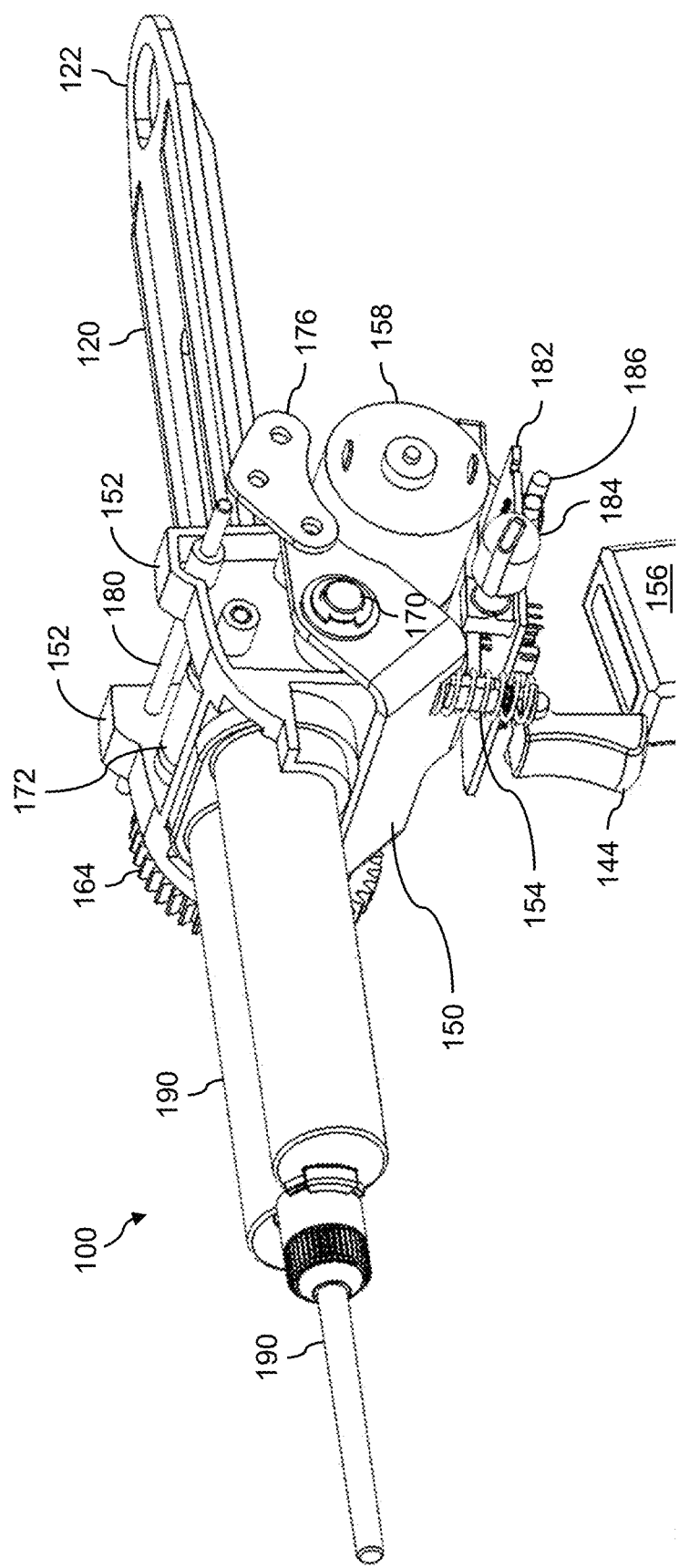
Figure 26:
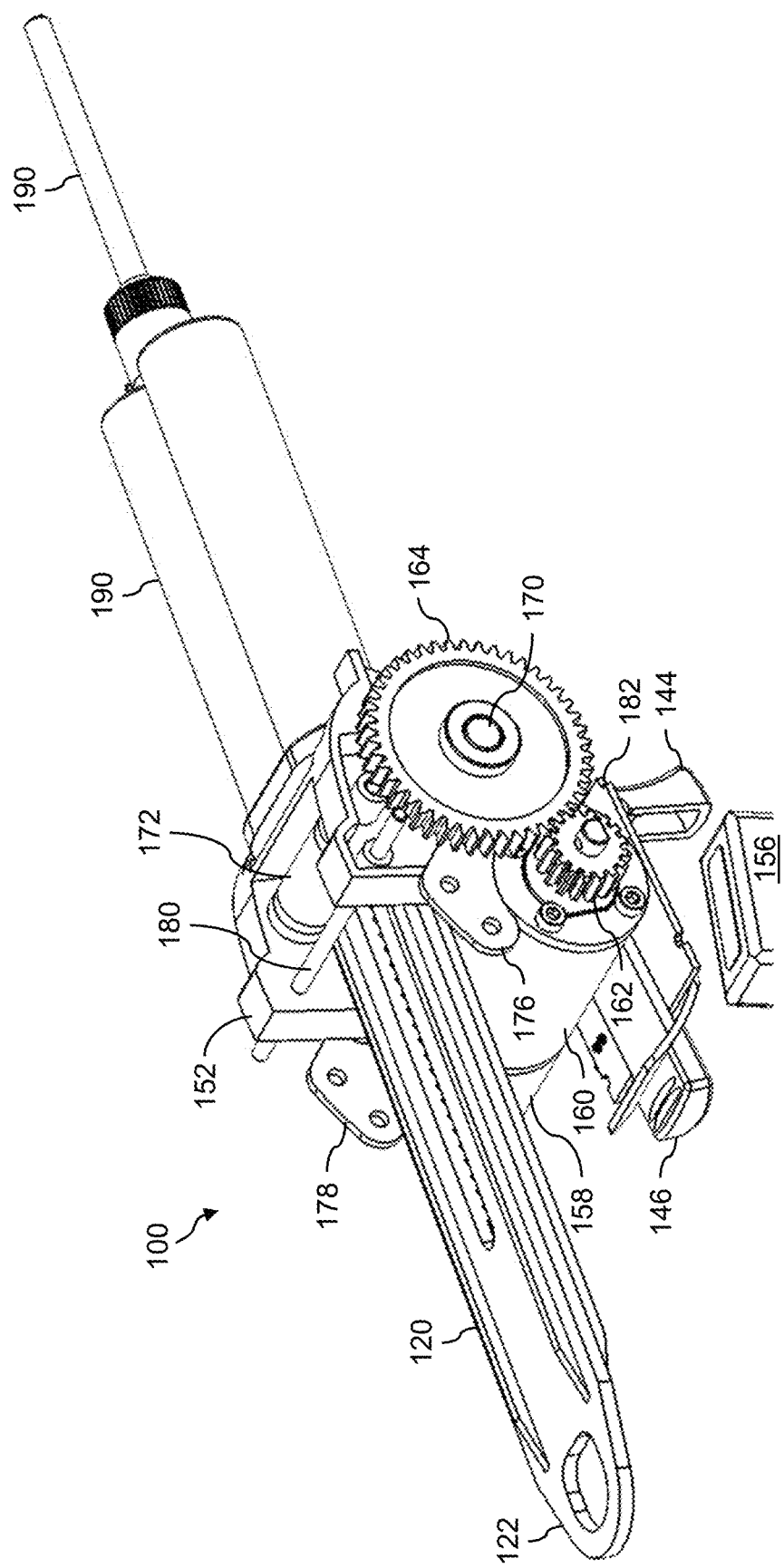
Figure 27:
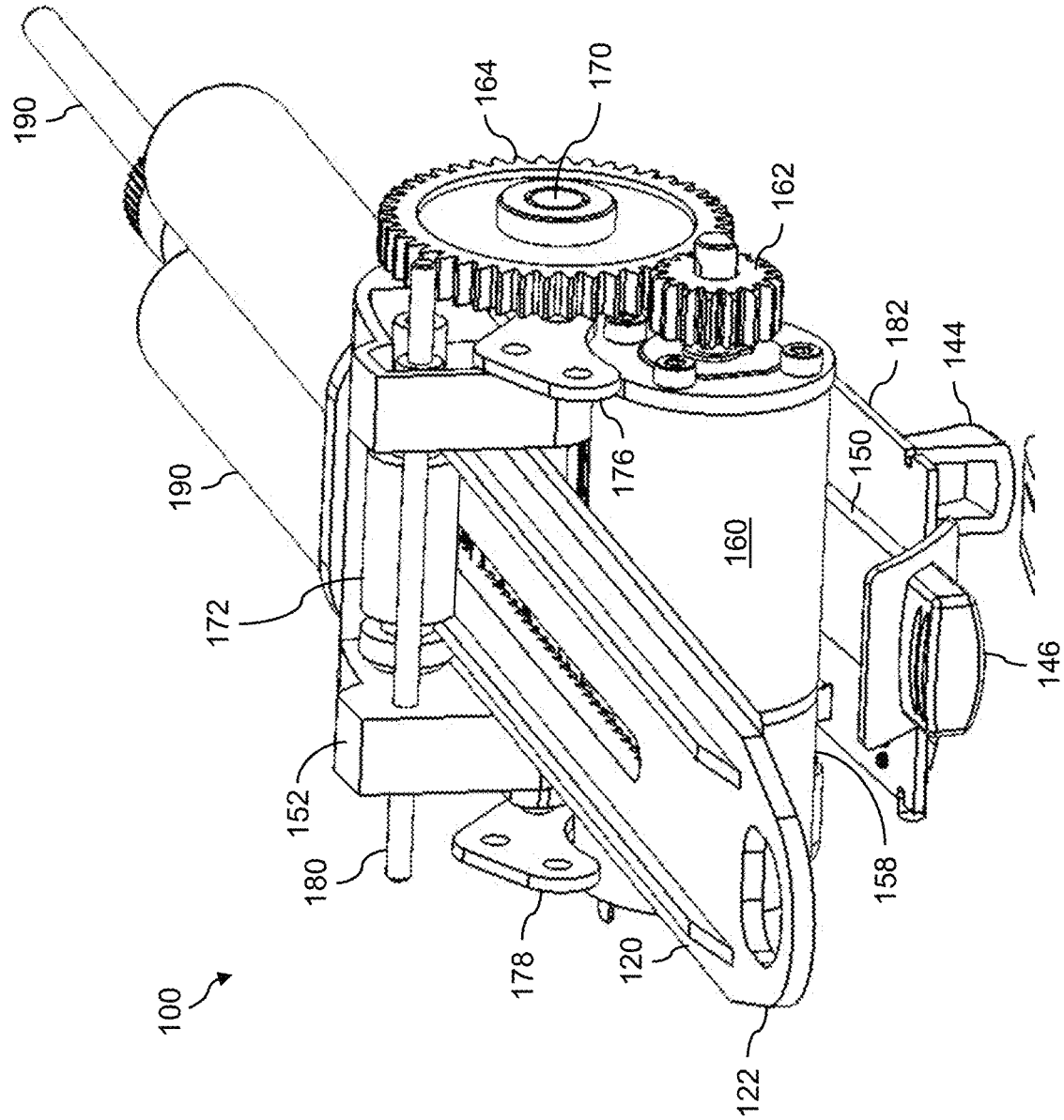
Figure 28:
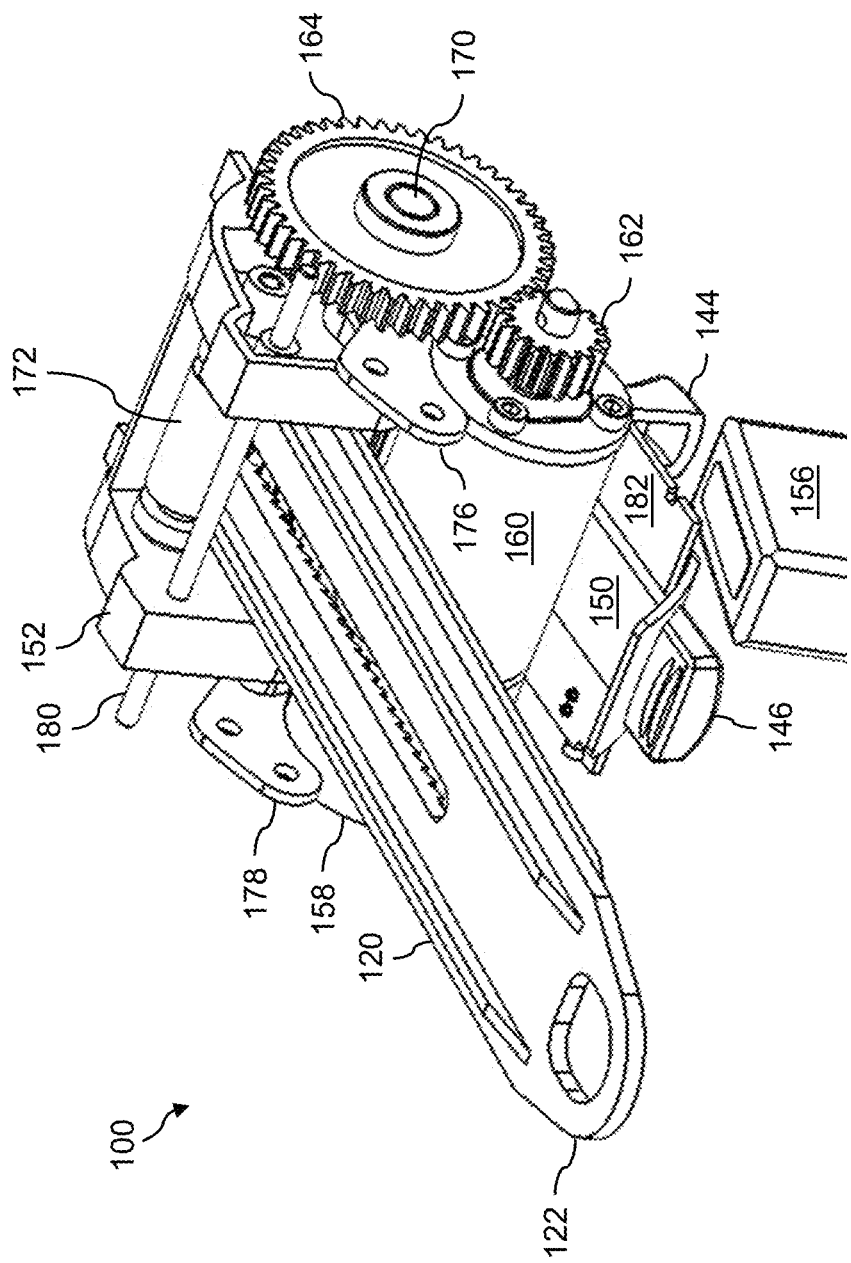
Figure 29:
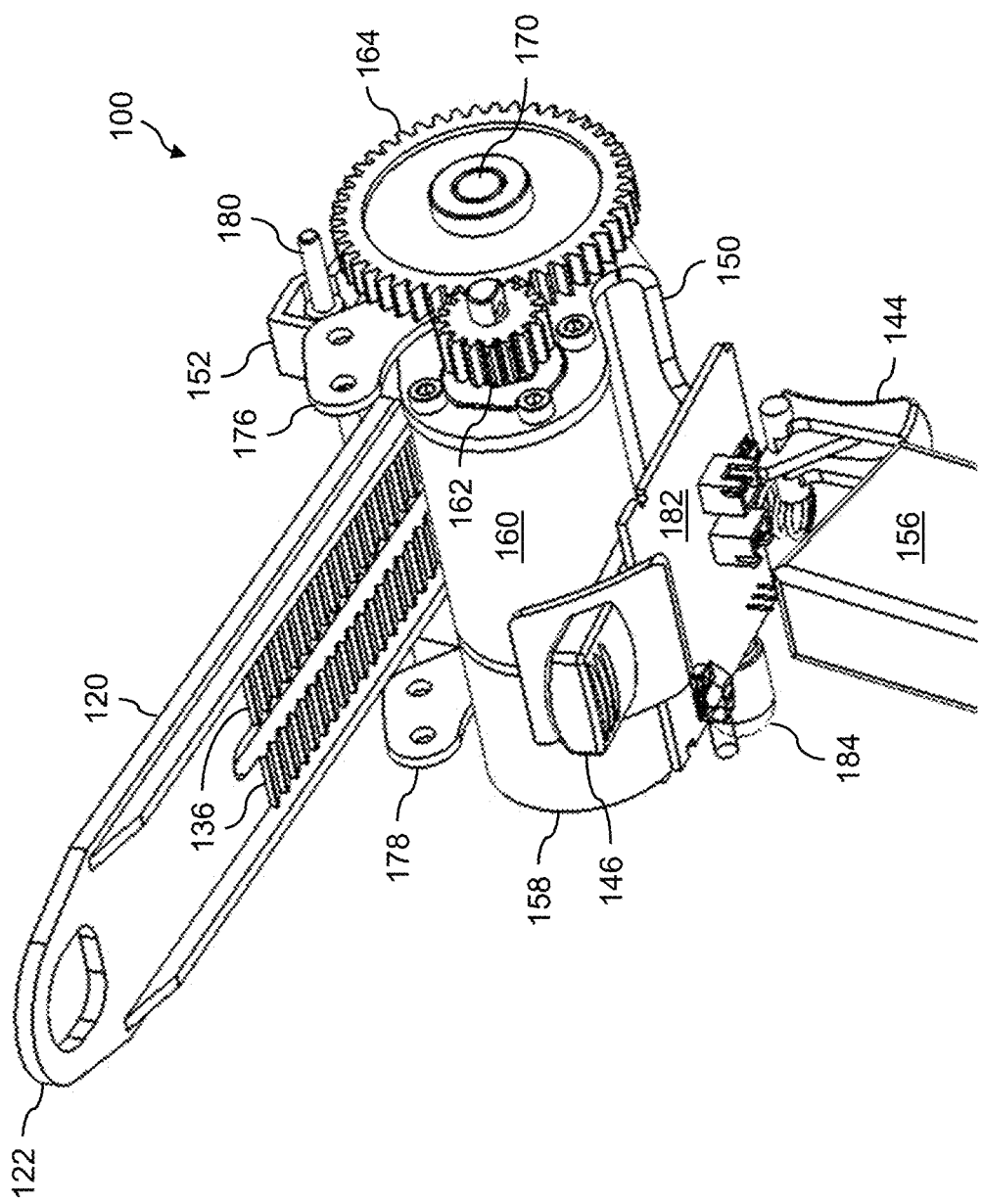
Figure 30:
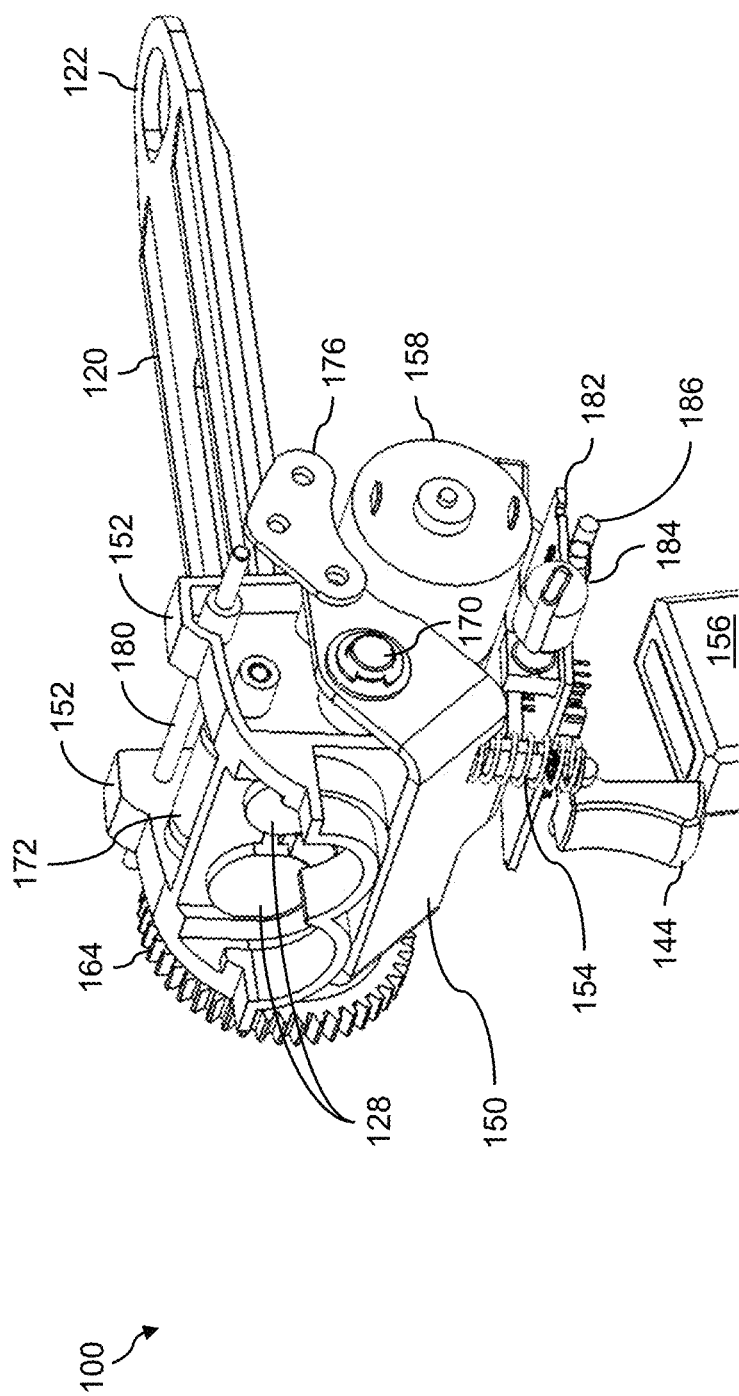
Figure 31:
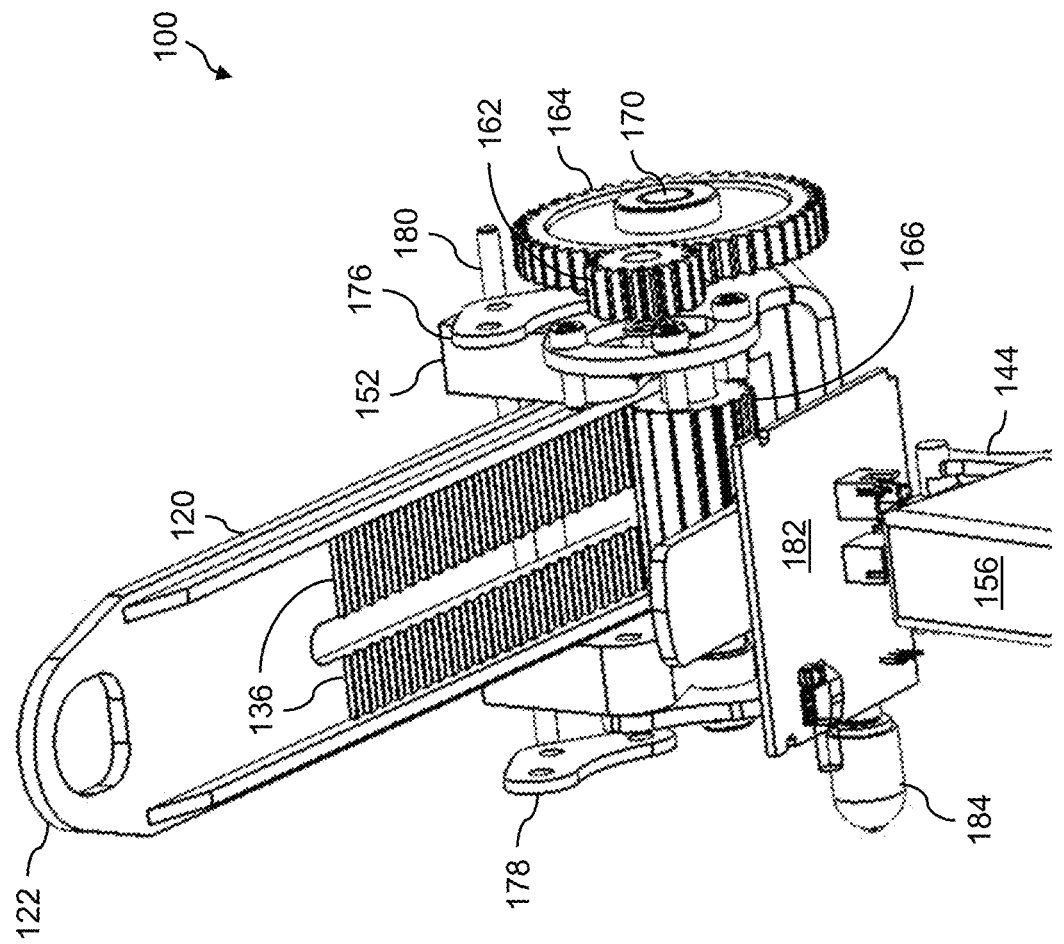
Figure 32:
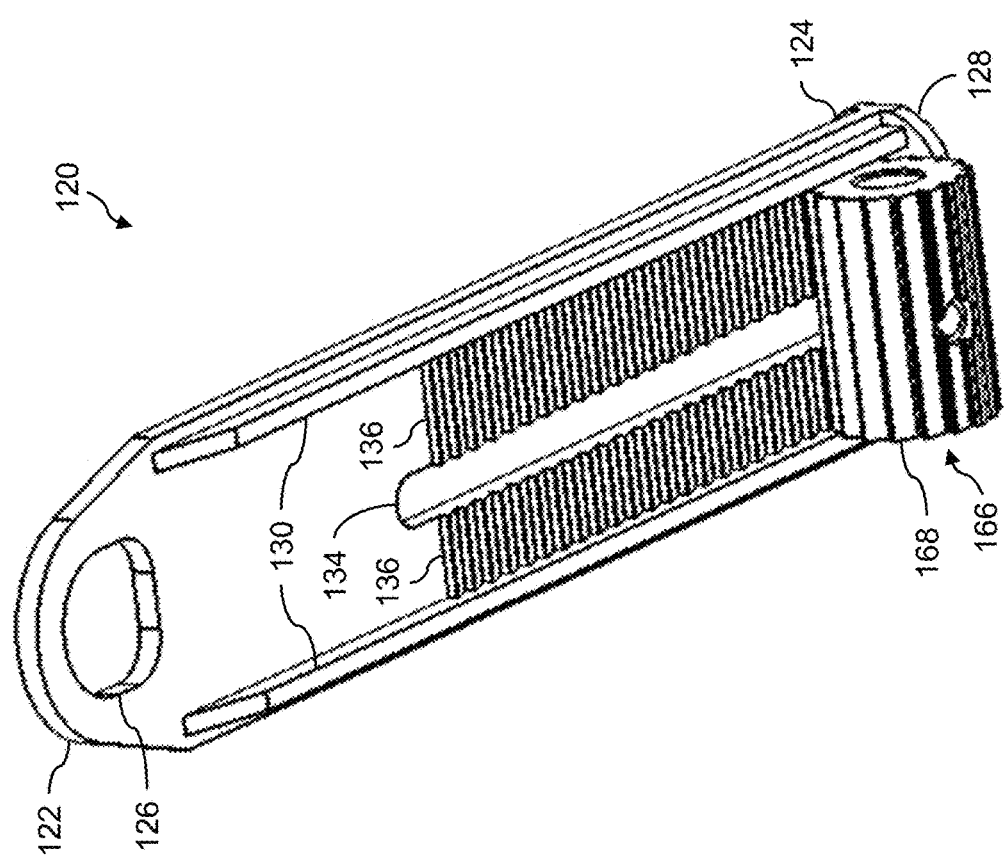
Figure 37:
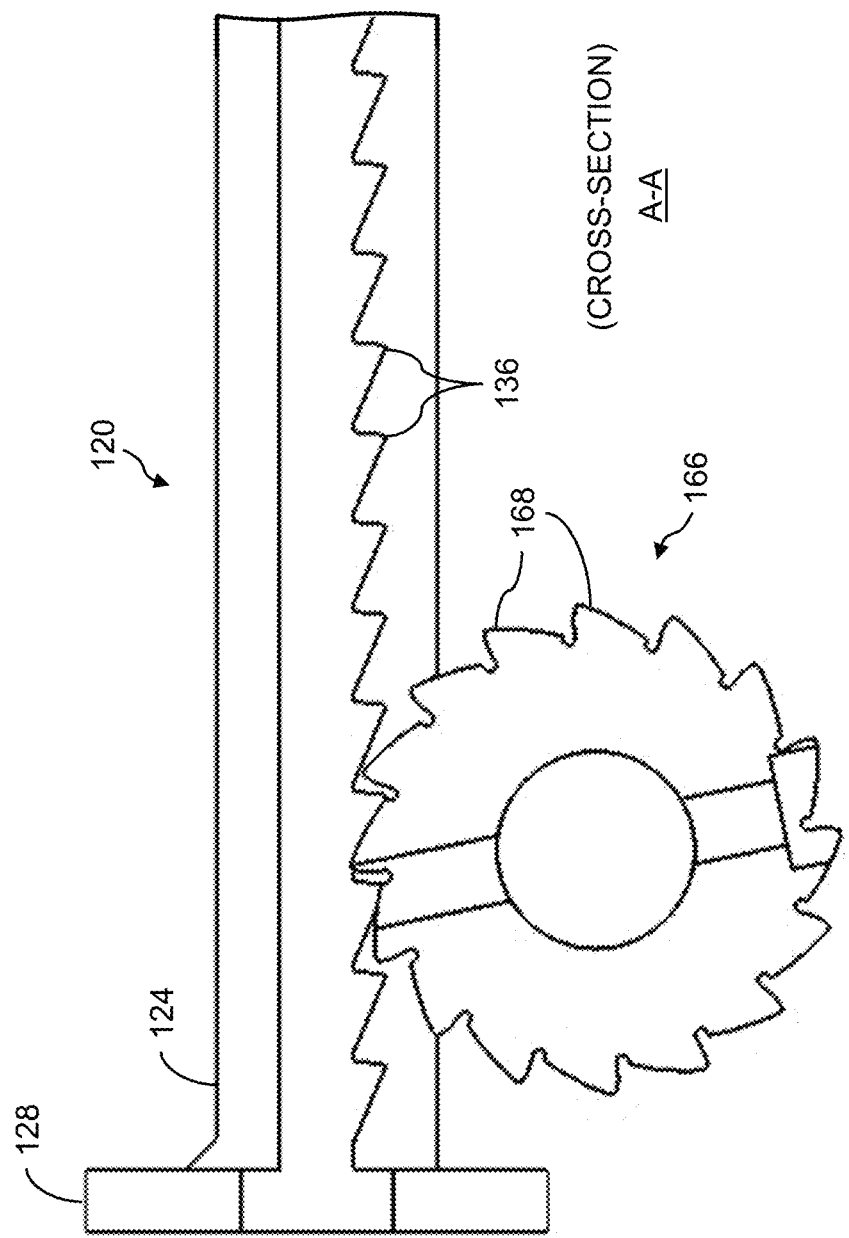
Figure 38:
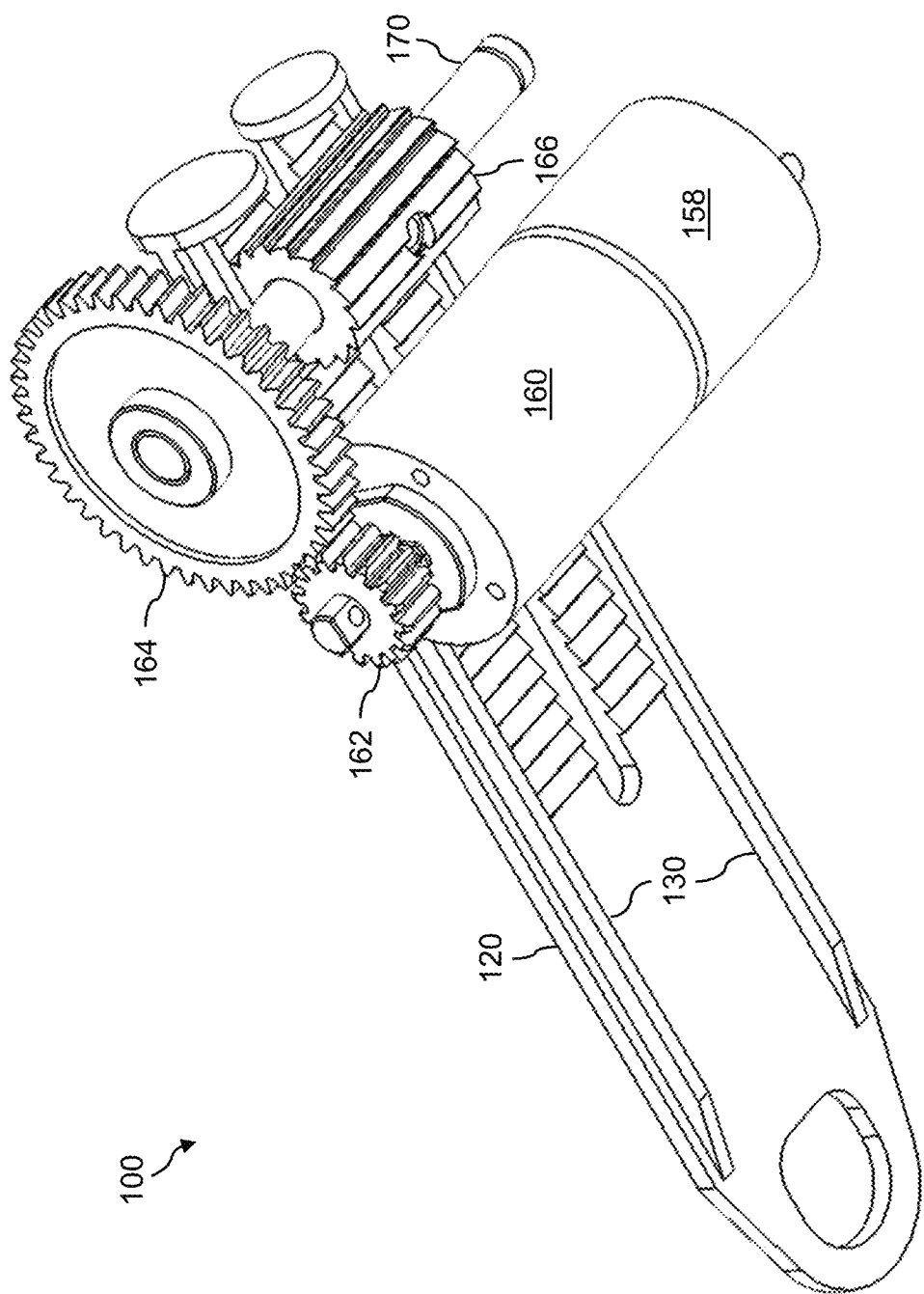
Figure 39:
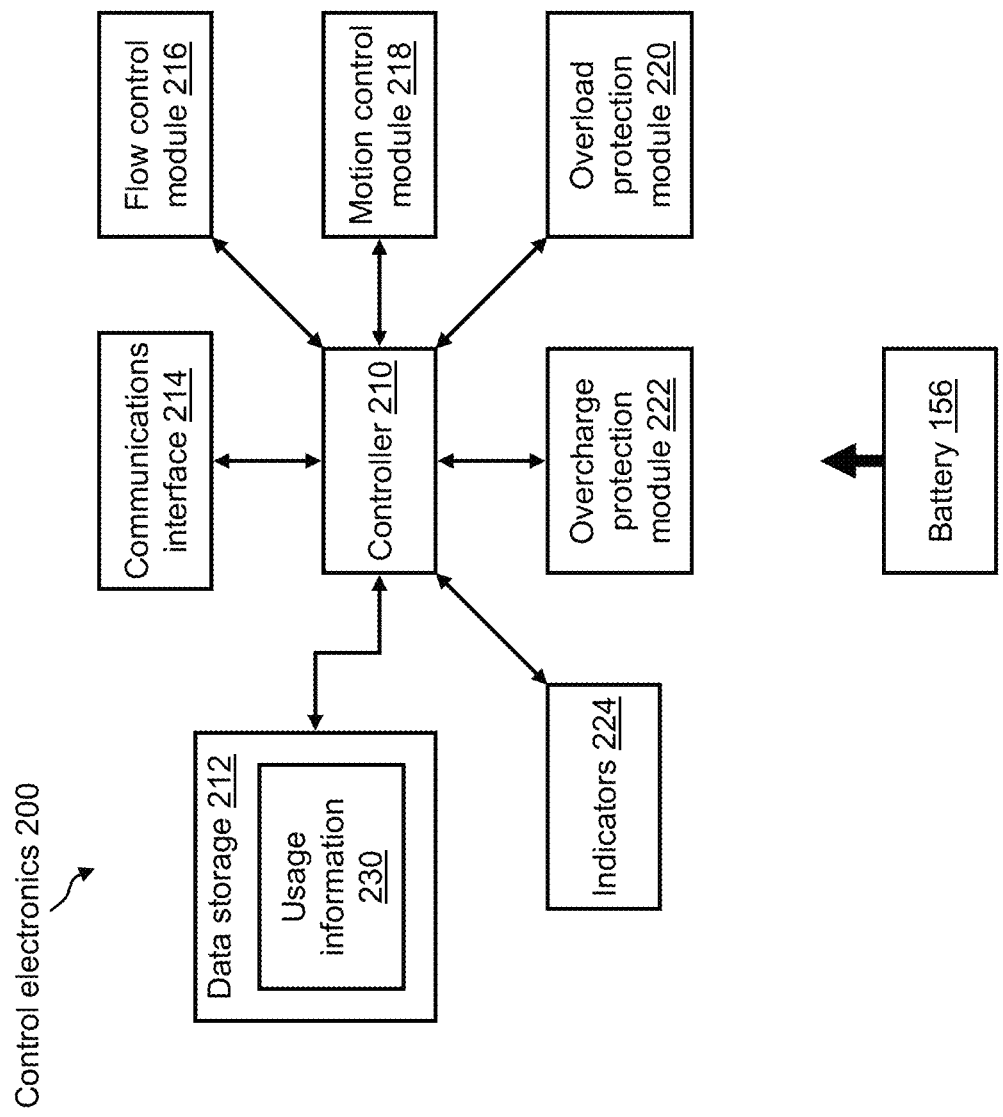
Figure 40:
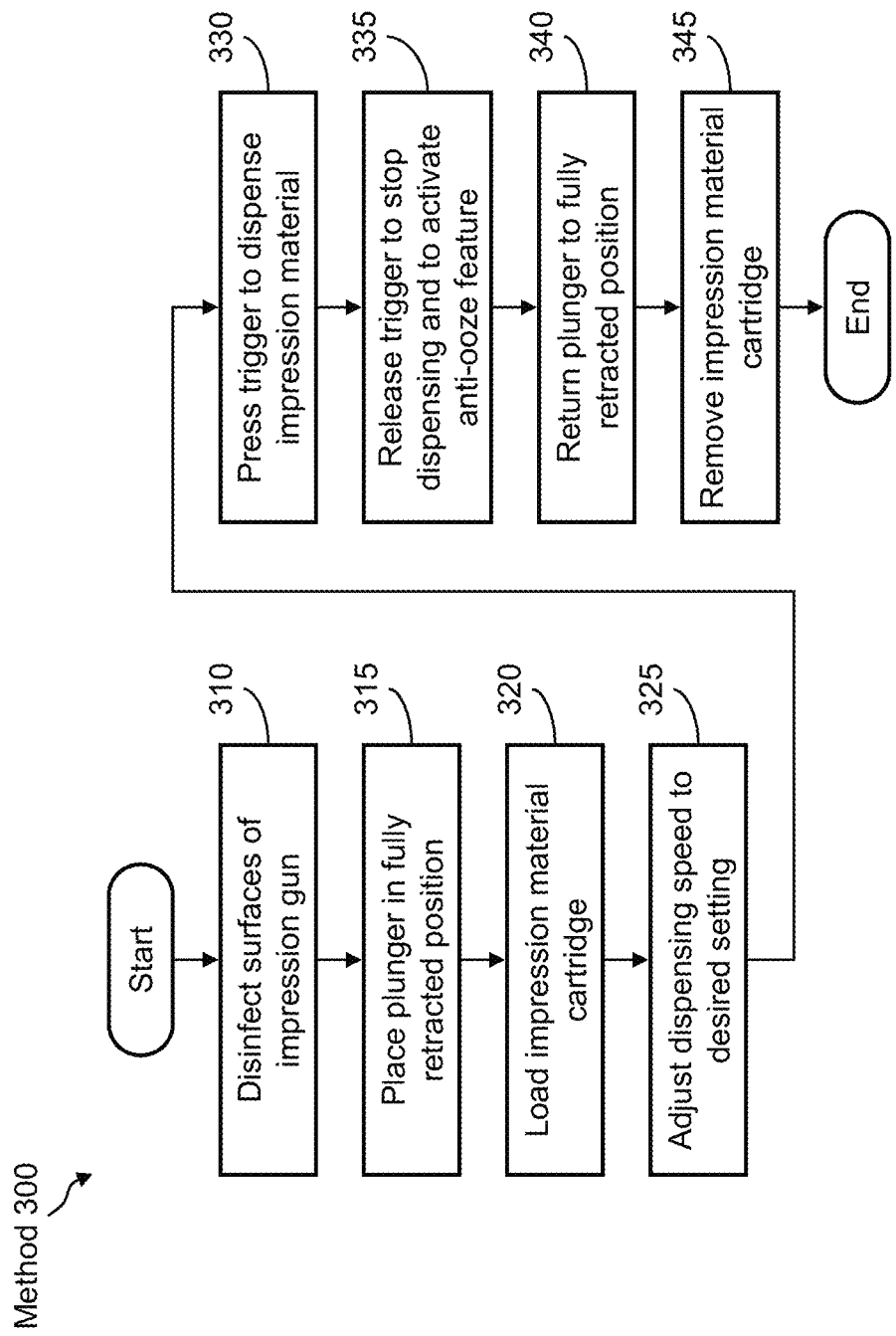
Figure 41:
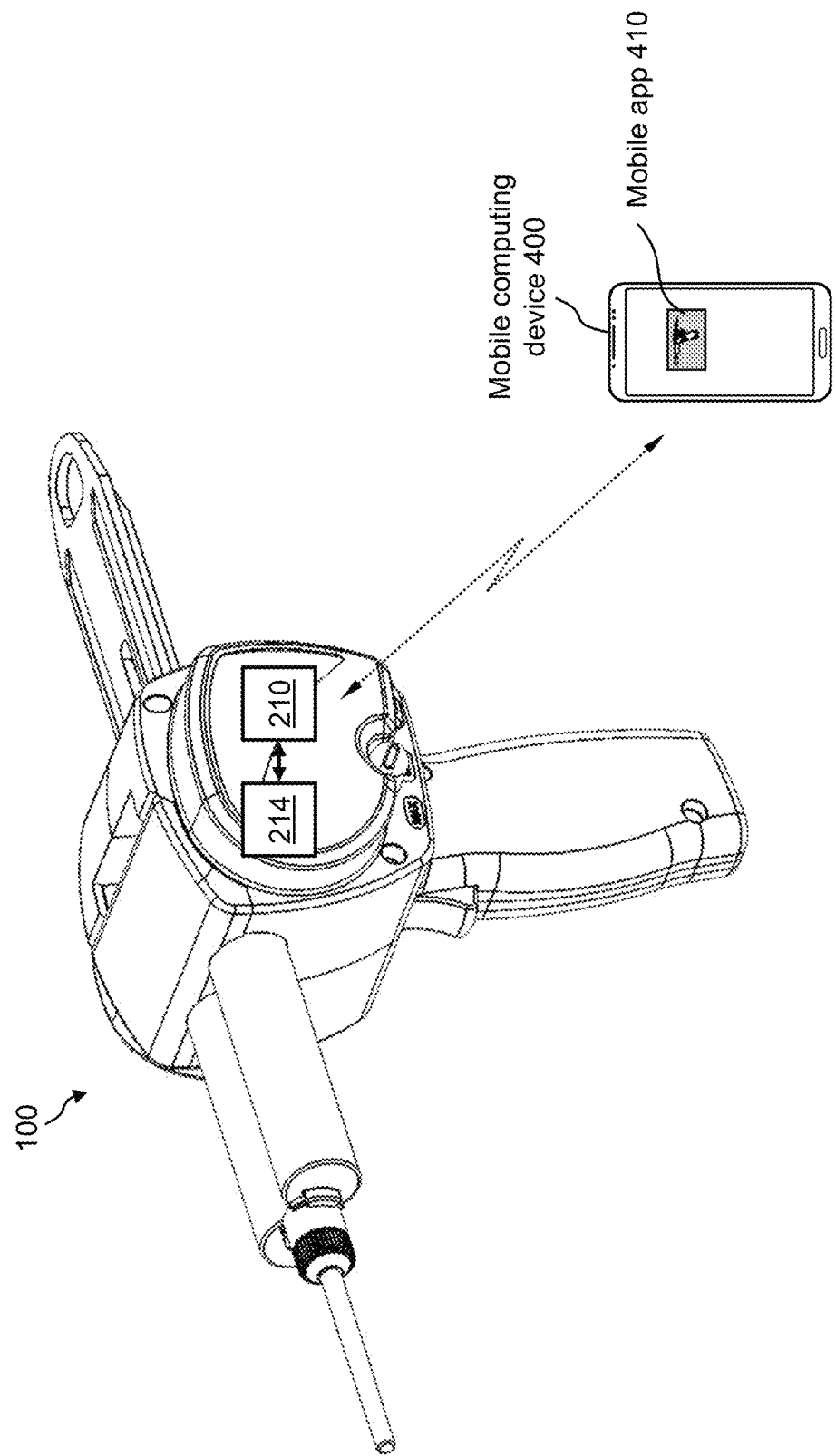

Having thus described the presently disclosed subject matter in general terms, reference will now be made to the accompanying Drawings, which are not necessarily drawn to scale, and wherein:

FIG. 1 illustrates a perspective view of an example of the presently disclosed dispensing gun with an material cartridge loaded therein and a perspective view of its corresponding charging base;

FIG. 2, FIG. 3, FIG. 4, FIG. 5, FIG. 6, FIG. 7, and FIG. 8 illustrate a perspective view, a left side view, a right side view, a front view, a back view, a top view, and a bottom view, respectively, of the dispensing gun shown in FIG. 1 and absent the material cartridge;

FIG. 9 illustrates a side view of the presently disclosed dispensing gun and showing a cartridge clamp (or door) in the open position;

FIG. 10, FIG. 11, FIG. 12, and FIG. 13 illustrate a perspective view, a left side view, a front view, and a back view, respectively, of the dispensing gun shown in FIG. 1 sitting in the charging base and with the material cartridge loaded therein;

FIG. 14, FIG. 15, and FIG. 16 illustrate a perspective view, a top view, and an exploded view, respectively, of the charging base of the dispensing gun shown in FIG. 1;

FIG. 17 illustrates an exploded view of the presently disclosed dispensing gun;

FIG. 18 illustrates a perspective view of the presently disclosed dispensing gun absent the material cartridge and with the plunger/drive rack in the fully retracted position;

FIG. 19 illustrates a perspective view of the presently disclosed dispensing gun absent the material cartridge and with the plunger/drive rack in a partially retracted position;

FIG. 20 illustrates a perspective view of the presently disclosed dispensing gun absent the left side enclosure and thereby showing more details of the inner components of the dispensing gun;

FIG. 21, FIG. 22, FIG. 23, and FIG. 24 illustrate a left side view, a right side view, a front view, and a back view, respectively, of the presently disclosed dispensing gun absent the left side enclosure, the right side enclosure, and the material cartridge;

FIG. 25, FIG. 26, and FIG. 27 illustrate various perspective views of the presently disclosed dispensing gun absent the left side enclosure, the right side enclosure, and the cartridge clamp;

FIG. 28, FIG. 29, FIG. 30, and FIG. 31 illustrate various perspective views of the presently disclosed dispensing gun absent the left side enclosure, the right side enclosure, the cartridge clamp, and the material cartridge;

FIG. 32 through FIG. 36 illustrate various views showing more details of the rack drive gear engaged with the plunger/drive rack of the presently disclosed dispensing gun;

FIG. 37 illustrates a cross-sectional view of the rack drive gear engaged with the plunger/drive rack of the presently disclosed dispensing gun;

FIG. 38 illustrates a perspective view of the motor drive portion of the presently disclosed dispensing gun;

FIG. 39 illustrates a block diagram of an example of the control electronics of the presently disclosed dispensing gun;

FIG. 40 illustrates a flow diagram of an example of a method of using the presently disclosed dispensing gun; and FIG. 41 shows an example of the presently disclosed dispensing gun operating in combination with a mobile computing device.

DETAILED DESCRIPTION

The presently disclosed subject matter now will be described more fully hereinafter with reference to the accompanying Drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Drawings. Therefore, it is to be understood that the presently disclosed subject matter is not to be limited to the specific embodiments disclosed and that modifications and other embodiments are intended to be included within the scope of the appended claims.

In some embodiments, the presently disclosed subject matter provides a motor-driven dispensing gun for and method of dispensing fluid or semi-fluid (or semi-solid) material. Namely, the presently disclosed motor-driven dispensing gun can be used for dispensing any type of fluid or semi-fluid material, such as, but not limited to, dental impression material used in the dental industry, glues/adhesives, caulking material, impression material used in audiology, and/or other fluid, semi-fluid, or semi-solid material.

The presently disclosed motor-driven dispensing gun is preferably a handheld, electric, material dispensing instrument that is based on a "rack-and-pinion" drive configuration for driving a plunger that is engaged with the material cartridge. Namely, the presently disclosed motor-driven dispensing gun includes a combination plunger and drive rack mechanism, hereafter called the plunger/drive rack. The plunger/drive rack provides a slideable and releasable drive rack. Further, the plunger/drive rack is an elongated flat member having an arrangement of teeth on its lower surface. A rack drive gear is provided for engaging with the teeth of the plunger/drive rack. The rack drive gear is driven by a DC motor that is mounted transverse to the plunger/drive rack. Further, the teeth of the rack drive gear and the teeth of the plunger/drive rack have a saw tooth type of profile that ensures reliable, non-slip coupling therebetween and provides optimal transfer of force between the rack drive gear and the plunger/drive rack.

An aspect of the presently disclosed motor-driven dispensing gun for and method of dispensing fluid or semi-fluid material is that it provides (1) rapid dispensing, (2) variable speed control, (3) late material discharge prevention upon releasing the trigger, also called the "anti-drip" feature, (4) an auto-stop feature with overload protection when the cartridge is empty, and (5) overcharge protection for the rechargeable battery.

Another aspect of the presently disclosed motor-driven dispensing gun for and method of dispensing fluid or semi-fluid material is that it provides a simple and low cost electric dispensing gun compared with conventional electric dispensing guns that are complex and expensive.

Referring now to FIG. 1 is a perspective view of an example of the presently disclosed dispensing gun 100 with a material cartridge 190 loaded therein. FIG. 1 also shows a perspective view of a charging base 105 that corresponds to the dispensing gun 100. Further, FIG. 2, FIG. 3, FIG. 4, FIG. 5, FIG. 6, FIG. 7, and FIG. 8 show a perspective view, a left side view, a right side view, a front view, a back view, a top view, and a bottom view, respectively, of the dispensing gun 100 shown in FIG. 1 and absent the material cartridge 190.

The presently disclosed dispensing gun 100 is a handheld, electric motor-driven, material dispensing instrument that is based on a "rack-and-pinion" drive configuration for driving a combination plunger and drive rack mechanism. The dispensing gun 100 can be, for example, a motorized dental impression gun, a motorized glue/adhesive gun, a motorized caulking gun, a motorized audiology impression gun, and any other hand-held motorized fluid or semi-fluid dispensing gun.

The dispensing gun 100 includes (among other components not named) a right side enclosure 116, a left side enclosure 118, a plunger/drive rack 120, a cartridge clamp (or door) 142, a trigger 144, a manual release lever 146, and a power/recharging port 148. Together, the right side enclosure 116, the left side enclosure 118, and the cartridge clamp (or door) 142 form the housing of the dispensing gun 100. The right side enclosure 116, the left side enclosure 118, and the cartridge clamp (or door) 142 can be formed, for example, of molded plastic. Additionally, the housing of the dispensing gun 100 includes a cartridge opening 192 (see FIG. 2) into which the material cartridge 190 can be fitted. Other components of the dispensing gun 100 are shown and described hereinbelow with reference to FIG. 9 through FIG. 41.

The material cartridge 190 is a consumable item with respect to the dispensing gun 100. Namely, the material cartridge 190 holds a quantity of fluid or semi-fluid material. In the example of the dispensing gun 100 being a dental impression gun, the material cartridge 190 may hold a quantity of PVS (or VPS) impression material. In this example, the material cartridge 190 can be, for example, a standard 25 ml, 50 ml, or 75 ml cartridge. Further, the size and/or features of the plunger/drive rack 120 can vary depending on whether the material cartridge 190 is a 25 ml-, 50 ml-, or 75 ml-cartridge.

The material cartridge 190 is loaded into the dispensing gun 100 and then the material is consumed during the dispensing process. Once the material is fully consumed, the material cartridge 190 can be removed from the dispensing gun 100 and a new one installed. For example, FIG. 9 shows a side view of the presently disclosed dispensing gun 100 and with the cartridge clamp (or door) 142 in the open position and ready for receiving the material cartridge 190. The cartridge clamp (or door) 142 is hingeably coupled to the top of the right side enclosure 116 and the left side enclosure 118. The cartridge clamp (or door) 142 serves as both the access door for loading and unloading the material cartridge 190 and the clamp for locking the material cartridge 190 into the cartridge opening 192 during use.

Figure 13:
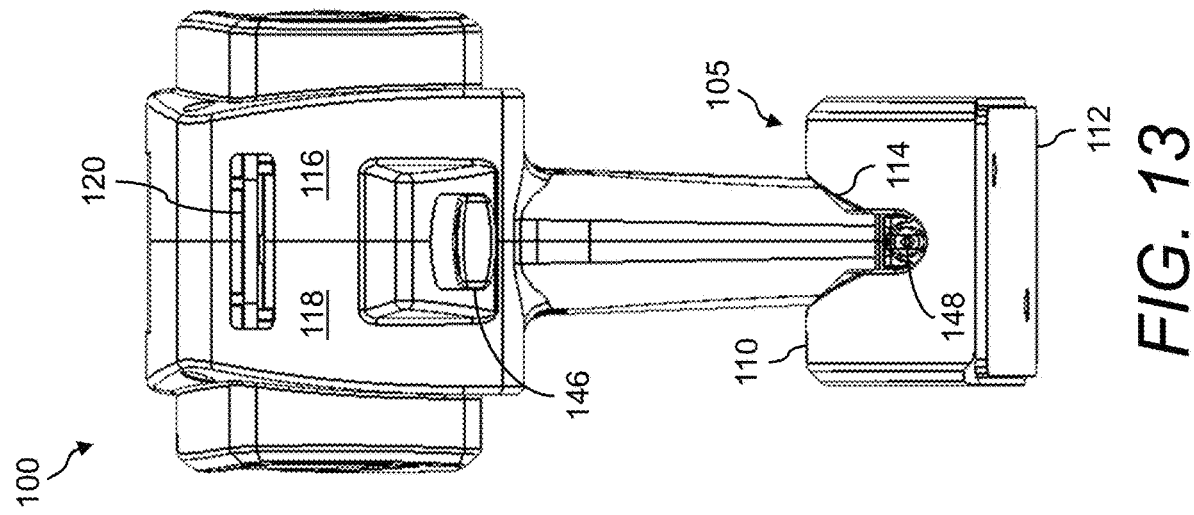
Figure 12:
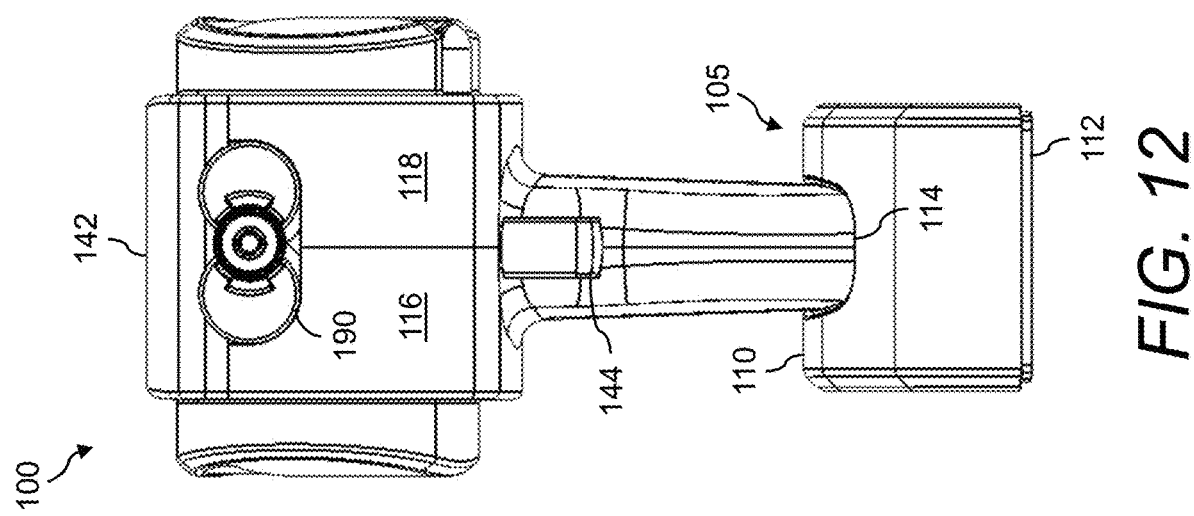

Referring now to FIG. 10, FIG. 11, FIG. 12, and FIG. 13 is a perspective view, a left side view, a front view, and a back view, respectively, of the dispensing gun 100 shown in FIG. 1 sitting in the charging base 105 and with the material cartridge 190 loaded therein. Further, FIG. 14, FIG. 15, and FIG. 16 is a perspective view, a top view, and an exploded view, respectively, of the charging base 105 of the dispensing gun 100 shown in FIG. 1. The charging base 105 includes a base enclosure 110 and a base plate 112 and wherein a holding compartment 114 is formed in the base enclosure 110. The holding compartment 114 is designed for receiving the handle portion of the dispensing gun 100. Further, a clearance region of the holding compartment 114 provides access to the power/recharging port 148 in the handle portion of the dispensing gun 100, as shown in FIG. 13.

Namely, the dispensing gun 100 includes a battery 156 (see FIG. 17). Accordingly, a standard AC adaptor 107 (see FIG. 2) is provided with dispensing gun 100 for recharging the battery 156. When the dispensing gun 100 is sitting in the charging base 105, the clearance region of the holding compartment 114 allows the AC adaptor 107 to be plugged into the power/recharging port 148 of the dispensing gun 100. In an alternate example, power recharging port 148 is disposed in charging base 105, and charging contact (not shown) are disposed on a bottom portion of the handle portion of the dispensing gun 100, such that the charging contacts of the handle contact with corresponding charging contacts (not shown) in the holding compartment 114 of the charging base 105. In one example, the battery 156 is an 11.1 volt, rechargeable, lithium-ion battery. In the dispensing gun 100, a fully charged battery 156 may be capable of processing, for example, about sixty full 50 ml impression material cartridges 190. Further, in one example, the battery 156 has a recharge time of from about 2 hours to about 2.5 hours. In another example, the battery 156 is a replaceable non-rechargeable battery, such as a standard 9 volt battery. In this example, the AC adaptor 107 is not used. In yet another example, the dispensing gun 100 is absent the battery 156 entirely. In this example, the dispensing gun 100 operates directly off the AC adaptor 107 which must be plugged in during use.

Referring now to FIG. 17 is an exploded view of the presently disclosed dispensing gun 100. Again, the dispensing gun 100 may include (among other components not named) the right side enclosure 116, the left side enclosure 118, the plunger/drive rack 120, the cartridge clamp (or door) 142, the trigger 144, the manual release lever 146, and the power/recharging port 148. Again, the charging base 105 includes the base enclosure 110 and the base plate 112. However, as shown in FIG. 17, the dispensing gun 100 may further include (among other components not named) a motor mount 150, an inside mount 152, a compression spring 154, the rechargeable battery 156, a motor 158, a gearbox 160, a pinion gear 162, a spur gear 164, a rack drive gear 166, a shaft 170, a pressure roller 172, a roller pin 174, a left pivot pin mount 176, a right pivot pin mount 178, a dowel 180, a system printed circuit board (PCB) 182, a speed control knob 184, and an indicator 186.

Referring now to FIG. 18 is a perspective view of the presently disclosed dispensing gun 100 absent the material cartridge 190 and with the plunger/drive rack 120 in the fully retracted position. The plunger/drive rack 120 is an elongated flat member that includes a grip end 122 (i.e., the proximal end) and a plunger end 124 (i.e., the distal end). In this view, the plunger end 124 of the plunger/drive rack 120 is hidden inside the head portion of the dispensing gun 100. By contrast, FIG. 19 shows the dispensing gun 100 with the plunger/drive rack 120 in a partially retracted position. In this view, the plunger end 124 of the plunger/drive rack 120 is advanced through the cartridge opening 192 and visible forward of the head portion of the dispensing gun 100.

Referring now to FIG. 20 through FIG. 31 is various views of the presently disclosed dispensing gun 100 and showing more details of the components thereof and more details of the specific arrangements one to another. Namely, FIG. 20 shows a perspective view of the dispensing gun 100 absent the left side enclosure 118. Further, FIG. 21, FIG. 22, FIG. 23, and FIG. 24 show a left side view, a right side view, a front view, and a back view, respectively, of the dispensing gun 100 absent the right side enclosure 116, the left side enclosure 118, and the material cartridge 190. Further, FIG. 25, FIG. 26, and FIG. 27 show various perspective views of the dispensing gun 100 absent the right side enclosure 116, the left side enclosure 118, and the cartridge clamp (or door) 142. Further, FIG. 28, FIG. 29, FIG. 30, and FIG. 31 show various perspective views of the dispensing gun 100 absent the right side enclosure 116, the left side enclosure 118, the cartridge clamp (or door) 142, and the material cartridge 190.

Referring now to FIG. 32 through FIG. 36 is various views showing more details of the rack drive gear 166 engaged with the plunger/drive rack 120 of the presently disclosed dispensing gun 100. Again, the plunger/drive rack 120 is an elongated flat member that includes the grip end 122 and the plunger end 124. There may be an opening 126 at the grip end 122 of the plunger/drive rack 120. There is a pair of disc-shaped push pads 128 at the plunger end 124 of the plunger/drive rack 120. A pair of lower guide rails 130 may be provided on the lower surface of the plunger/drive rack 120. Similarly, a pair of upper guide rails 132 may be provided on the upper surface of the plunger/drive rack 120. Further, a slot 134 may be provided along the length of the plunger/drive rack 120, wherein the slot 134 may extend from a midway portion of the plunger/drive rack 120 and opens to the plunger end 124 of the plunger/drive rack 120 and between the two push pads 128. Further, an arrangement of rack teeth 136 is provided along the lower surface of the plunger/drive rack 120 and on both sides of the slot 134. Further, the rack drive gear 166 includes an arrangement of drive gear teeth 168 that are designed to engage with the rack teeth 136 of the plunger/drive rack 120 to form a rack-and-pinion type of configuration.

Figure 33:
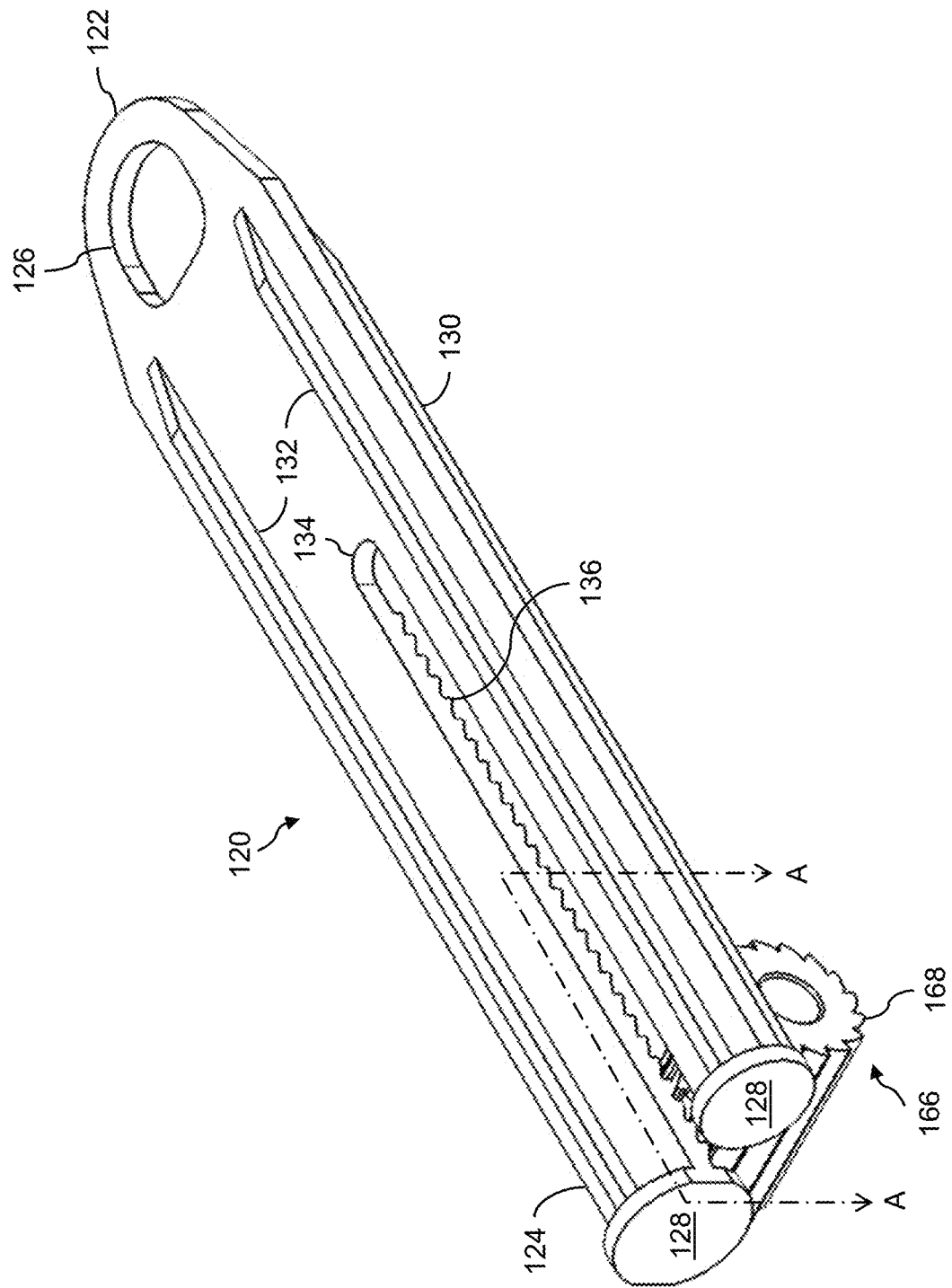
Figure 34:
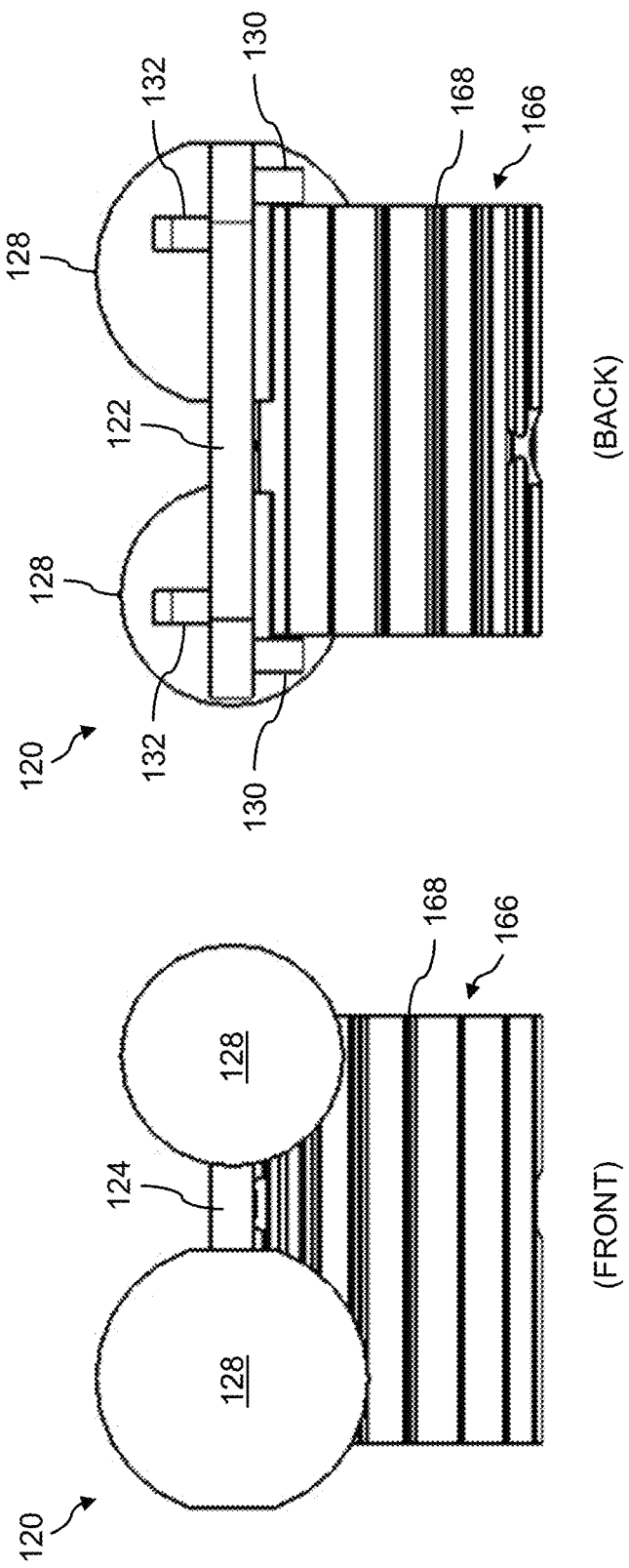
Figure 35:
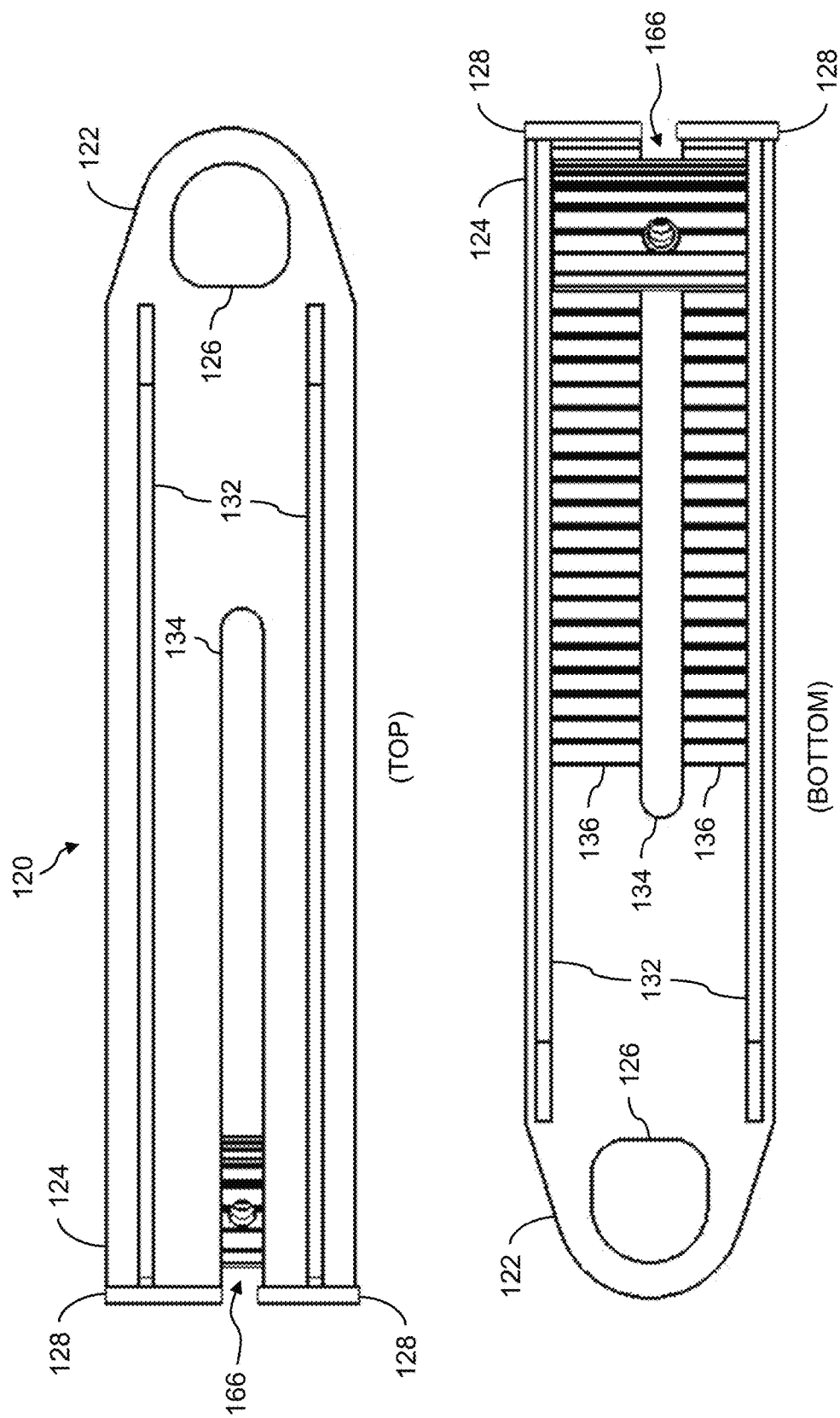
Figure 36:
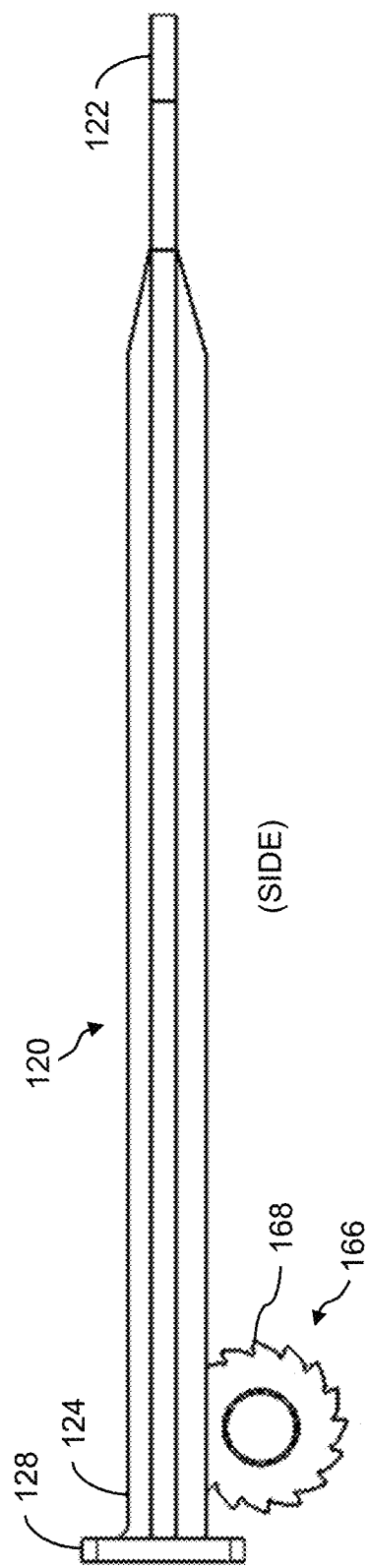

Referring now to FIG. 37 is a cross-sectional view of the rack drive gear 166 engaged with the plunger/drive rack 120 taken along line A-A of FIG. 33. In one embodiment, the drive gear teeth 168 of the rack drive gear 166 and the rack teeth 136 of the plunger/drive rack 120 have a saw tooth type of profile that ensures reliable, non-slip coupling therebetween and provides optimal transfer of force between the rack drive gear 166 and the plunger/drive rack 120. Accordantly, the saw tooth gear profile of the plunger/drive rack 120 and the rack drive gear 166 provide benefit as compared with conventional manual or motorized dispensing guns that include gear mechanisms that feature the standard involute gear profile. In operation, the plunger/drive rack 120 is driven forward by motor power using the rack drive gear 166 that is driven by the motor 158. In one example, the plunger/drive rack 120 may be retracted manually by the user. Namely, the user may press down on the manual release lever 146, and then grasps the grip end 122 of the plunger/drive rack 120 and pulls back on the plunger/drive rack 120.

Referring now to FIG. 38 is a perspective view of the motor drive portion of the presently disclosed dispensing gun 100. Namely, FIG. 38 shows the rack drive gear 166 engaged with the rack teeth 136 of the plunger/drive rack 120. The rack drive gear 166 and the plunger/drive rack 120 are aligned via the lower guide rails 130. The rack drive gear 166 is mechanically coupled to the spur gear 164 via the shaft 170. The spur gear 164 is mechanically coupled to the pinion gear 162. The pinion gear 162 is mechanically coupled to the motor 158 via the gearbox 160. That is, the motor 158 drives the pinion gear 162 via the gearbox 160. Then the pinion gear 162 drives the spur gear 164 and thereby drives the rack drive gear 166 via the shaft 170. In one example, the motor 158 may be a 12 VDC motor, the pinion gear 162 may be a 16-tooth gear, the spur gear 164 may be a 46-tooth gear, and the rack drive gear 166 may be a 16-tooth gear. In one example, the diameter of the shaft 170 may be about 8 mm.

Referring now to FIG. 39 is a block diagram of an example of control electronics 200 of the presently disclosed dispensing gun 100. The control electronics 200 may be any control electronics for managing the operations of the dispensing gun 100. The control electronics 200 can be implemented on the system PCB 182, wherein the system PCB 182 can be a standard multilayer PCB.

The control electronics 200 may include, for example, a controller 210, some amount of data storage 212, a communications interface 214, a flow control module 216, a motion control module 218, an overload protection module 220, an overcharge protection module 222, and certain indicators 224. Further, the power source for control electronics 200 may be the battery 156.

The controller 210 can be any standard controller or microprocessor device that is capable of executing program instructions. The controller 210 manages the overall operations of the dispensing gun 100. The data storage 212 can be any volatile or non-volatile memory device. The data storage 212 can be built into or separate from controller 210. Further, the data storage 212 can be any combination of onboard and portable memory, such as a secure digital (SD) card.

The communications interface 214 may be any wired and/or wireless communication interface for connecting to a network (not shown) and by which information may be exchanged with other devices connected to the network. Examples of wired communication interfaces may include, but are not limited to, USB ports, RS232 connectors, RJ45 connectors, Ethernet, and any combinations thereof. Examples of wireless communication interfaces may include, but are not limited to, an Intranet connection, Internet, ISM, Bluetooth® technology, Bluetooth® Low Energy (BLE) technology, Wi-Fi, Wi-Max, IEEE 402.11 technology, ZigBee technology, Z-Wave technology, 6LoW-PAN technology (i.e., IPv6 over Low Power Wireless Area Network (6LoWPAN)), ANT or ANT+(Advanced Network Tools) technology, radio frequency (RF), Infrared Data Association (IrDA) compatible protocols, Local Area Networks (LAN), Wide Area Networks (WAN), Shared Wireless Access Protocol (SWAP), any combinations thereof, and other types of wireless networking protocols.

The flow control module 216 can be a software or hardware module for controlling the speed of dispensing, which is variable. For example, pressing the trigger 144 activates the motor 158. Then, the flow control module 216 senses the position of the speed control knob 184 to set the speed of the motor 158. Then, the plunger/drive rack 120 advances according to the speed of the motor 158. Using this technique, the dispensing speed of the impression material can vary, for example, from about 0.6 ml/sec to about 1.7 ml/sec. Further, the speed control knob 184 can be adjusted based on the viscosity of the impression material being used. In another example, the amount of pressure on the trigger 144 can be used to control the speed of dispensing. For example, light pressure on the trigger 144 correlates to low speed and heavy pressure correlates to high speed.

The motion control module 218 can be a software or hardware module for preventing late discharge of impression material. Namely, when the trigger is released a reverse motion can be automatically and momentarily applied to the plunger/drive rack 120 in order to prevent late discharge of impression material. In this way, an automatic "anti-drip" feature is provided in the dispensing gun 100.

The overload protection module 220 can be a software or hardware module for preventing motor overload at the end of the plunger travel (i.e., when the cartridge is empty). Namely, the overload protection module 220 senses any excessive load on the motor 158 and automatically deactivates the motor 158. In this way, an automatic auto-stop feature is provided in the dispensing gun 100.

The overcharge protection module 222 can be a software or hardware module for sensing the charge state of the rechargeable battery 156 and preventing an overcharge condition.

The indicators 224 can be any type of visual (e.g., LED), audible (e.g., beeps, tones), and/or tactile (e.g., vibration) indicators for indicating any condition of interest in the dispensing gun 100. The indicator 186 is an example of the indicators 224. For example, the indicator 186 can be an LED that indicates a low battery condition.

Further, any information of interest can be stored in the data storage 212. In one example, usage information 230 is stored in the data storage 212. The usage information 230 may include, for example, timestamp information, trigger-pull information, dispensing rate information, material type information, dispensing process information, and any combinations thereof for each use of the dispensing gun 100.

Referring now to FIG. 40 is a flow diagram of an example of a method 300 of using the presently disclosed dispensing gun 100. The method 300 may include, but is not limited to, the following steps.

At a step 310, the surfaces of the dispensing gun 100 may be disinfected. For example, the surfaces of the presently disclosed dispensing gun 100 are disinfected by wiped clean using accepted cleaning practices. In another example, the surfaces of the dispensing gun 100 may be protected with a surface barrier or wrap as needed.

At a step 315, the plunger is placed in the fully retracted position. For example, the plunger/drive rack 120 of the dispensing gun 100 is placed in the fully retracted position. Namely, the user presses down on the manual release lever 146, and then grasps the grip end 122 of the plunger/drive rack 120 and pulls back on the plunger/drive rack 120.

At a step 320, the material cartridge 190 is loaded into the dispensing gun 100. For example, the user opens the cartridge clamp (or door) 142, then installs the material cartridge 190 into the dispensing gun 100, and then closes the cartridge clamp (or door) 142.

At a step 325, the dispensing speed is adjusted to the desired setting. For example, the user adjusts the speed control knob 184 to the desired setting. The dispensing speed may depend on the viscosity of the material being dispensed. For example, the maximum speed setting may be recommended for dispensing heavier body materials, for example dispensing dental impression material into impression trays. By contrast, a lower speed setting may be recommended for dispensing light body materials, such as for intraoral application where precision placement is needed.

At a step 330, the trigger is pressed to dispense the material. For example, the user presses the trigger 144, which activates the motor 158 and advances the plunger/drive rack 120. In so doing, the material is dispensed from the material cartridge 190.

At a step 335, the trigger is released to stop dispensing the material and to activate the anti-drip feature. For example, the user releases the trigger 144 to stop dispensing the material. In that instant, the automatic anti-drip feature of the motion control module 218 is activated. For example, no matter what the speed control knob 184 is set at, the motor 158 reverses at full speed for about 1.5 seconds. In so doing, the plunger/drive rack 120 pulls back rapidly for a moment in order to reduce or entirely prevent dripping.

At a step 340, the plunger is returned to the fully retracted position. For example, the user presses down on the manual release lever 146, and then grasps the grip end 122 of the plunger/drive rack 120 and pulls back on the plunger/drive rack 120. In so doing, the plunger/drive rack 120 of the dispensing gun 100 is returned to the fully retracted position.

At a step 345, the material cartridge is removed from the dispensing gun 100. For example, the user opens the cartridge clamp (or door) 142, then removes the material cartridge 190 from the dispensing gun 100, and then closes the cartridge clamp (or door) 142.

Referring now to FIG. 41 is an example of the presently disclosed dispensing gun 100 operating in combination with a mobile computing device 400. The mobile computing device 400 can be any mobile computing device, such as a mobile phone (i.e., a smartphone), a tablet device, a laptop computer, and the like. Further, a mobile app 410 is installed and running on the mobile computing device 400. The mobile app 410 can be, for example, an iOS mobile app for an Apple iPhone or an Android mobile app for an Android phone. The mobile app 410 of the mobile computing device 400 can be used, for example, to process any information in the data storage 212 of the dispensing gun 100. In one example, the dispensing gun 100 uses the controller 210 and the communications interface 214 to communicate wirelessly (e.g., via Bluetooth®) with the mobile computing device 400.

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some embodiments, ±100% in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Although the foregoing subject matter has been described in some detail by way of illustration and example for purposes of clarity of understanding, it will be understood by those skilled in the art that certain changes and modifications can be practiced within the scope of the appended claims.

That which is claimed:

1. A motor-driven material dispensing apparatus, comprising:
   a. a housing comprising a main body portion and a handle portion;
   b. a plunger/drive rack, the plunger drive rack comprising a plurality of saw tooth shaped rack teeth, wherein each of the saw tooth shaped rack teeth comprise a substantially flat face portion;
   c. an electric motor mounted in the main body portion, wherein the electric motor is configured such that a rotational axis of the electric motor is transverse to a direction of travel of the plunger/drive rack and parallel to the plane of a rack drive gear; and
   d. a gear system housed in the main body portion, wherein the gear system is mechanically coupled to the electric motor and configured to drive the plunger/drive rack, and wherein the gear system includes the rack drive gear operatively engaged with the electric motor, the rack drive gear comprising a plurality of saw tooth shaped gear teeth, wherein a leading face of each of the saw tooth shaped gear teeth is substantially flat and perpendicular relative to an axis of rotation of the rack drive gear, and wherein the leading face of each of the saw tooth shaped gear teeth is configured to engage in a substantially face-to-face relationship with the substantially flat face portion of a corresponding one of the rack teeth disposed on the plunger/drive rack.

2. The apparatus of claim 1 wherein the gear system further comprises a pinion gear and a spur gear, wherein the rack drive gear is mechanically coupled to the spur gear, the spur gear is mechanically coupled to the pinion gear, and the pinion gear is mechanically coupled to the electric motor.

3. The apparatus of claim 1 wherein a trigger switch is provided to operate the electric motor to drive the gear system and effect dispensing of the material in response to the longitudinal movement of the plunger/drive rack into engagement with one or more material cartridges comprising the material therein.

4. The apparatus of claim 3 wherein the electric motor comprises an adjustable variable speed motor.

5. The apparatus of claim 4 wherein upon release of the trigger switch, the electric motor automatically reverses its direction for a defined period of time reversing the direction of the rack drive gear thereby reversing the movement of plunger/drive rack.

6. The apparatus of claim 5 wherein upon release of the trigger switch, the electric motor automatically reverses its direction at full speed, regardless of its speed setting.

7. The apparatus of claim 5 wherein the defined period of time is about 1.5 seconds.

8. The apparatus of claim 4 further comprising a speed controller configured to allow a user to adjust a speed of the adjustable variable speed motor.

9. The apparatus of claim 3 wherein the plunger/drive rack includes a plunger end at its distal end configured to engage with the one or more material cartridges, the plunger end comprising push pads.

10. The apparatus of claim 9 wherein the plunger/drive rack includes a slot along its length extending from about a midway portion of the plunger/drive rack and opening to the plunger end between the push pads.

11. The apparatus of claim 9 wherein the plunger/drive rack gear teeth are provided on both sides of the slot.

12. The apparatus of claim 1 further comprising a cartridge opening formed in the upper housing portion, wherein the cartridge opening is configured to receive one or more material cartridges in a position forward of the plunger/drive rack.

13. The apparatus of claim 12 further comprising a cartridge clamp hingeably coupled to the upper housing portion, wherein the cartridge clamp is positioned and configured to provide access for loading and unloading the one or more material cartridges when in an open position and to secure the one or more material cartridges into the cartridge opening when in a closed position.

14. The apparatus of claim 1 further comprising a rechargeable battery housed in the handle portion.

15. The apparatus of claim 14 further comprising at least one of a charging and power port disposed in the handle portion.

16. The apparatus of claim 15 further comprising a base configured to receive the handle portion.

17. The apparatus of claim 1 further comprising a release lever configured for manual removal of the plunger/drive rack from the main body portion.

18. The apparatus of claim 1 further comprising control electronics, comprising one or more of a controller, memory device, communications interface; flow control module, motion control module, overload protection module, overcharge protection module, and one or more indicators.

19. The apparatus of claim 1 wherein the material comprises one or more of fluid, semi-fluid, and semi-solid material.

20. A method of using a motor-driven material dispensing apparatus, the method comprising:
   a. providing the motor-driven dispensing apparatus, the dispensing apparatus comprising:
      i. a housing comprising a main body portion and a handle portion;
      ii. a plunger/drive rack, the plunger drive rack comprising a plurality of saw tooth shaped rack teeth, wherein each of the saw tooth shaped rack teeth comprise a substantially flat face portion;
      iii. an electric motor mounted in the main body portion, wherein the electric motor is configured such that a rotational axis of the electric motor is transverse to a direction of travel of the plunger/drive rack and parallel to the plane of a rack drive gear;
      iv. a gear system housed in the main body portion, wherein the gear system is mechanically coupled to the electric motor and configured to drive the plunger/drive rack, and wherein the gear system includes the rack drive gear operatively engaged with the electric motor, the rack drive gear comprising a plurality of saw tooth shaped gear teeth, wherein a leading face of each of the saw tooth shaped gear teeth is substantially flat and perpendicular relative to an axis of rotation of the rack drive gear, and wherein the leading face of each of the saw tooth shaped gear teeth is configured to engage in a substantially face-to-face relationship with the substantially flat face portion of a corresponding one of the rack teeth disposed on the plunger/drive rack;
b. loading material to be dispensed;
c. setting dispensing speed;
d. activating the dispensing apparatus; and
e. deactivating the dispensing apparatus.

21. The method of claim 20 further comprising upon deactivating the dispensing apparatus automatically activating the electric motor to reverse its direction for a defined period of time.

22. The method of claim 21 wherein the material comprises one or more of fluid, semi-fluid, and semi-solid material.

* * * * *